(12) United States Patent
Murata et al.

(10) Patent No.: US 10,677,198 B2
(45) Date of Patent: Jun. 9, 2020

(54) BLOCKAGE DETECTION SYSTEM AND BLOCKAGE DETECTION METHOD

(71) Applicant: HONDA MOTOR CO., LTD., Tokyo (JP)

(72) Inventors: Yuichiro Murata, Wako (JP); Masahiro Fujii, Wako (JP); Hidenori Sakai, Wako (JP); Shuma Yatabe, Tokyo (JP); Daijiro Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 248 days.

(21) Appl. No.: 15/648,957

(22) Filed: Jul. 13, 2017

(65) Prior Publication Data

US 2018/0017022 A1   Jan. 18, 2018

(30) Foreign Application Priority Data

Jul. 13, 2016  (JP) ................. 2016-138266

(51) Int. Cl.
*F02M 25/08* (2006.01)
*G01M 3/02* (2006.01)
*G01M 15/09* (2006.01)
*F02M 35/10* (2006.01)

(52) U.S. Cl.
CPC .... *F02M 25/0809* (2013.01); *F02M 25/0872* (2013.01); *G01M 3/025* (2013.01); *G01M 15/09* (2013.01); *F02M 35/10222* (2013.01)

(58) Field of Classification Search
CPC .......... F02M 25/0809; F02M 25/0872; F02M 35/10222; G01M 3/025; G01M 15/09

USPC ........................................................ 701/101
See application file for complete search history.

(56) References Cited

U.S. PATENT DOCUMENTS

| | | | | |
|---|---|---|---|---|
| 5,445,015 A | * | 8/1995 | Namiki ............. | F02M 25/0809 73/114.39 |
| 2002/0184942 A1 | * | 12/2002 | Isobe ................. | F02M 25/0809 73/114.41 |
| 2005/0000273 A1 | * | 1/2005 | Hosoya ............. | F02M 25/0818 73/49.7 |
| 2009/0266147 A1 | * | 10/2009 | Maegawa .......... | F02M 25/0818 73/40.7 |
| 2013/0184963 A1 | * | 7/2013 | Jackson ............ | F02M 25/0809 701/101 |
| 2014/0102421 A1 | * | 4/2014 | Kato .................. | F02M 25/0818 123/520 |
| 2016/0053726 A1 | * | 2/2016 | Dudar ................ | F02M 25/089 123/520 |

(Continued)

*Primary Examiner* — David Hamaoui
*Assistant Examiner* — John D Bailey
(74) *Attorney, Agent, or Firm* — Westerman, Hattori, Daniels & Adrian, LLP

(57) ABSTRACT

A blockage determination portion 174 of a blockage detection system 30 determines that no blockage has occurred in a purge line 90, if a flow rate V of an inner fluid Fi exceeds a flow rate threshold THv while an internal pressure Pi of the purge line 90 is reduced from a first pressure value P1 to a second pressure value P2, for example. The blockage determination portion 174 determines that a blockage has occurred in the purge line 90, if the flow rate V of the inner fluid Fi falls below the flow rate threshold THv after the internal pressure Pi is reduced from the first pressure value P1 to the second pressure value P2.

5 Claims, 19 Drawing Sheets

(56) References Cited

U.S. PATENT DOCUMENTS

| | | | |
|---|---|---|---|
| 2016/0265480 A1* | 9/2016 | Fukui | F02M 25/0809 |
| 2016/0355390 A1* | 12/2016 | Pursifull | G05B 15/02 |
| 2017/0067414 A1* | 3/2017 | Dudar | F02M 25/0809 |
| 2017/0145963 A1* | 5/2017 | Dudar | B60K 15/03504 |
| 2017/0198662 A1* | 7/2017 | Dudar | F02D 41/0042 |
| 2017/0260932 A1* | 9/2017 | Brock | F02M 25/0872 |
| 2018/0045127 A1* | 2/2018 | Miura | B60K 15/03519 |

* cited by examiner

WHEN CALCULATING REFERENCE EXHAUST SPEED

WHEN DETECTING BLOCKAGE

10A

BLOCKAGE DETECTION SYSTEM AND BLOCKAGE DETECTION METHOD

CROSS-REFERENCE OF RELATED APPLICATION

This application claims priority of Japanese Patent Application No. 2016-138266 filed in Japan on Jul. 13, 2016, the entire contents of which are incorporated herein by reference.

Technical Field

The present invention relates to a blockage detection system and a blockage detection method for detecting blockage in a purge line that purges volatile fuel in a fuel tank to an intake system of an internal combustion engine.

Background of the Invention

United States Patent Application Publication No. 2013-0184963 (Abstract) discloses a system for a vehicle including a first pressure module and a blockage indication module. The first pressure module receives a signal from a pressure sensor that measures pressure within a fuel vapor purge system. The first pressure module generates a first pressure (second initial pressure) based on the signal at a first timing. The first pressure module also generates a second pressure (second final pressure) ([0037]) based on the signal at a second timing after the elapse of a predetermined period from the first timing, while operating a vacuum pump 134 ([0035]). The blockage indication module indicates whether a blockage is present in the fuel vapor purge system between the pressure sensor and a fuel tank, based on a difference between the first and second pressures ([0038]).

SUMMARY OF THE INVENTION

As described above, in United States Patent Application Publication No. 2013-0184963, it is determined whether a blockage is present between the pressure sensor and the fuel tank, based on a difference between the first pressure (second initial pressure) at the first timing, and the second pressure (second final pressure) at the second timing after the elapse of a predetermined period from the first timing (Abstract, [0037], [0033]). The predetermined period referred to in the disclosure appears to be a fixed value.

If the predetermined period is a fixed value, an excessively long predetermined period may cause excessive decompression, and affect durability of the fuel vapor purge system (or the purge line, for example). Meanwhile, an excessively short predetermined period may inhibit detection of a significant pressure difference, and lower the accuracy of blockage detection.

The present invention has been made in view of the above problem, and aims to provide a blockage detection system and a blockage detection method that enable at least one of improvement in durability and improvement in blockage detection accuracy.

A blockage detection system of the present invention detects blockage in a purge line that purges volatile fuel in a fuel tank to an intake system of an internal combustion engine, the blockage detection system including
a computer that determines occurrence of blockage in the purge line, and characterized in that:
the computer includes
a negative pressure controller that controls a negative pressure supplied to the purge line from a negative pressure source, and
a blockage determination part that determines whether a blockage is present in the purge line; and
the blockage determination part
determines that no blockage has occurred in the purge line, if a flow rate of an inner fluid in the purge line exceeds a flow rats threshold, during or after reduction of a pressure of the purge line from a first pressure value to a second pressure value by the negative pressure controller, and
determines that a blockage has occurred in the purge line, if the flow rate of the inner fluid falls below the flow rate threshold, after reduction of the pressure of the purge line from the first pressure value to the second pressure value by the negative pressure controller.

According to the present invention, it is determined that no blockage has occurred in the purge line, if a flow rate of an inner fluid in the purge line exceeds a flow rate threshold, during or after reduction of a pressure of the purge line from a first pressure value to a second pressure value. Also, it is determined that a blockage has occurred in the purge line, if the flow rate of the inner fluid falls below the flow rate threshold, after reduction of the pressure of the purge line from the first pressure value to the second pressure value. Hence, by setting an appropriate second pressure value, it is possible to avoid excessive decompression, and prevent deterioration in the purge line and other parts due to excessive decompression.

The blockage determination part may have
an exhaust speed calculator that calculates an exhaust speed of the inner fluid during operation of the negative pressure source,
an elapsed time calculator that calculates an elapsed time from a time point when the pressure of the purge line is the first pressure value, and
a flow rate calculator that calculates a flow rate of the inner fluid based on the exhaust speed and the elapsed time. Hence, it is possible to calculate the flow rate of the inner fluid by a simple method.

The blockage detection system may include:
a switching valve that is formed in the purge line;
an orifice that introduces any one of the inner fluid and fresh air;
a negative pressure pump as the negative pressure source;
a pump negative pressure sensor that detects a negative pressure generated by the negative pressure pump;
a first bypass channel that connects the switching valve and the negative pressure pump; and
a second bypass channel that connects the orifice and the negative pressure pump.

Also, the computer may calculate the exhaust speed based on a difference between atmospheric pressure and the negative pressure and a diameter of the orifice, after reducing the negative pressure to a reference pressure value by operating the negative pressure pump with the purge line cut off from an inlet of the negative pressure pump by the switching valve. Moreover, the computer may calculate the elapsed time while reducing the negative pressure by the negative pressure pump with the purge line connected to the inlet of the negative pressure pump by the switching valve.

According to the present invention, the exhaust speed is calculated while actually operating the negative pressure pump. Hence, it is possible to detect the flow rate of the inner fluid accurately, even when there is change (including deterioration) in the state of the negative pressure pump, individual difference, or change in the atmospheric pressure. Additionally, when using the negative pressure pump or the like for a different purpose (e.g., leakage detection of purge line), it is possible to detect blockage in the purge line by using existing equipment.

The computer may calculate the exhaust speed as a fixed value. The computer may also set the first pressure value as a value larger than the reference pressure value. The computer may also set the second pressure value as a value smaller than the reference pressure value.

Accordingly, when calculating the elapsed time, the pressure of purge line temporarily passes the reference pressure value. Hence, the environment of calculating the exhaust speed and the environment of calculating the elapsed time can be brought close to each other. This can enhance detection accuracy of the elapsed time and the flow rate of the inner fluid, even when the exhaust speed varies according to variation of the pressure of the purge line.

If the negative pressure source is the internal combustion engine, the blockage detection system may include an internal combustion engine negative pressure sensor that detects a negative pressure generated by the internal combustion engine. Also, the negative pressure controller may control a negative pressure generated by the internal combustion engine and supplied to the purge line, through a regulating valve arranged between the purge line and the internal combustion engine.

Thus, it is possible to detect blockage in the purge line even when using an internal combustion engine as the negative pressure source. Additionally, use of the regulating valve for negative pressure control enables detailed control of the negative pressure for blockage detection, so that blockage detection accuracy can be enhanced.

A blockage detection method of the present invention is a method for detecting blockage in a purge line that purges volatile fuel in a fuel tank to an intake system of an internal combustion engine by use of a computer, characterized in that the computer performs a negative pressure control step of controlling a negative pressure supplied to the purge line from a negative pressure source, and a blockage determination step of determining whether a blockage is present in the purge line, and in the blockage determination step, determines that no blockage has occurred in the purge line, if a flow rate of an inner fluid in the purge line exceeds a flow rate threshold, daring or after reduction of a pressure of the purge line from a first pressure value to a second pressure value by the negative pressure source, and determines that a blockage has occurred in the purge line, if the flow rate of the inner fluid fails below the flow rate threshold, after reduction of the pressure of the purge line from the first pressure value to the second pressure value by the negative pressure source.

EFFECT OF THE INVENTION

The present invention can achieve at least one of improvement in durability and improvement in blockage detection accuracy.

DETAILED DESCRIPTION OF THE INVENTION

A. First Embodiment

<A-1. Configuration>
[A-1-1. Overall Configuration]

Figure 1:
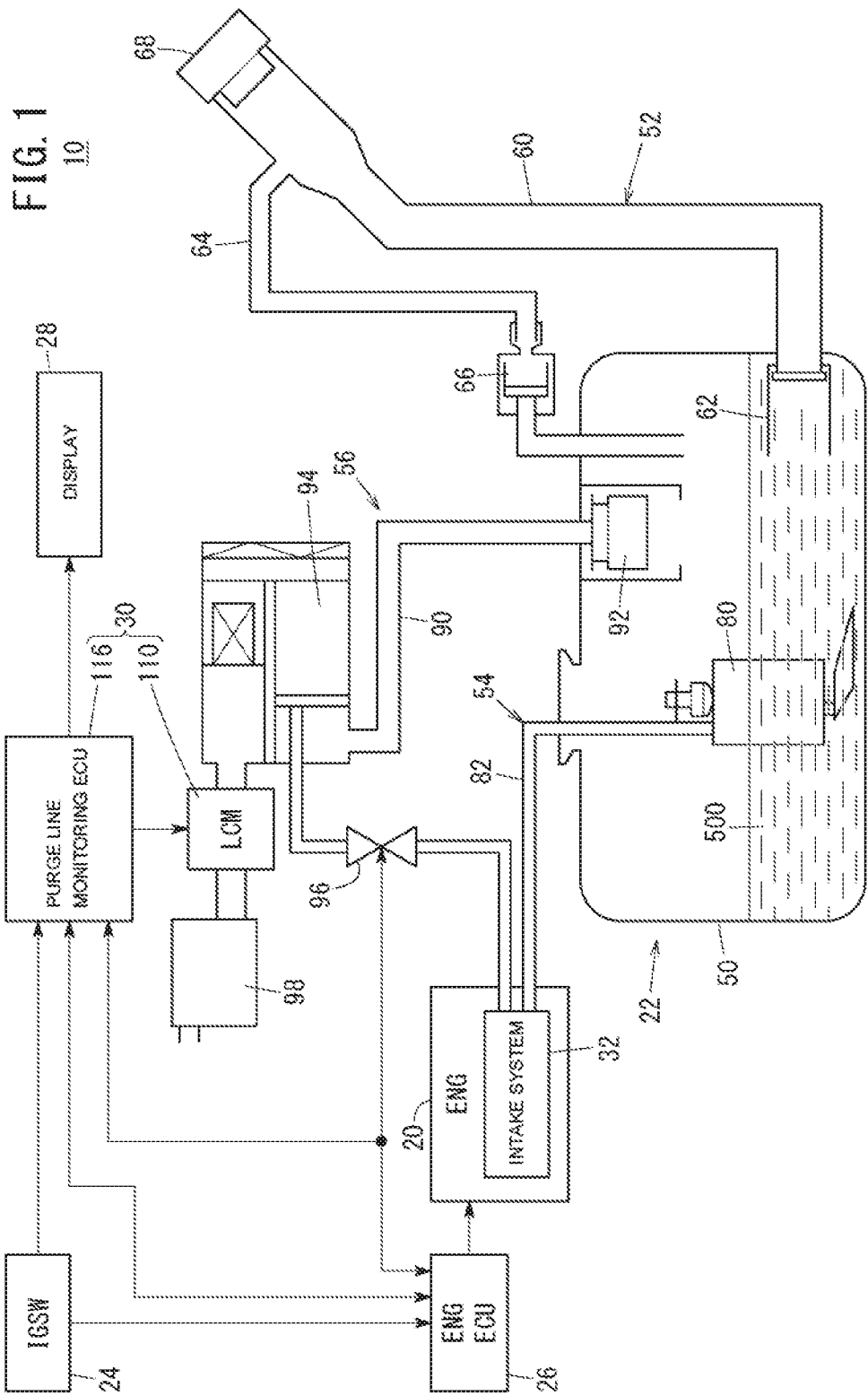
FIG. 1 is a diagram showing a simplified configuration of a vehicle that includes a purge line monitoring system as a blockage detection system of a first embodiment of the present invention.

FIG. 1 is a diagram showing a simplified configuration of a vehicle 10 that includes a purge line monitoring system 30 (hereinafter also referred to as "monitoring system 30") as a blockage detection system of a first embodiment of the present invention. In addition to the monitoring system 30, the vehicle 10 includes an engine 20, a fuel storage system 22, an ignition switch 24 (hereinafter referred to as "IGSW 24."), an engine electronic control unit 26 (hereinafter referred to as "engine ECU 26" or "ENG ECU 26."), and a display 28. The fuel storage system 22 stores a liquid which is a volatile fuel (e.g., gasoline) of the vehicle 10. The fuel storage system 22 includes a fuel tank 50 (fluid container), a fuel filling mechanism 52, a fuel feeding mechanism 54, and a gas exhaust mechanism 56.

[A-1-2. Fuel Filling Mechanism 52]

The fuel filling mechanism 52 (hereinafter also referred to as "filling mechanism 52.") is a mechanism for filling the fuel tank 50 (hereinafter also referred to as "tank 50.") with a fuel 500 from outside. The filling mechanism 52 has a filler pipe 60 (fluid guide part), a fuel filler valve mechanism 62 (hereinafter also referred to as "valve mechanism 62."), a breather line 64, a first rollover valve 66, and a fuel cap 68. The first rollover valve 66 automatically shuts off fuel when the vehicle 10 rolls over.

[A-1-3. Fuel Feeding Mechanism 54]

The fuel feeding mechanism 54 is a mechanism that feeds the engine 20 with the fuel 500 from the tank 50. The fuel feeding mechanism 54 has a pump 80 and piping 82 (feed line). The pump 80 delivers the fuel 500 to the engine 20 through the piping 82, on the basis of an instruction of the engine ECU 26.

[A-1-4. Gas Exhaust Mechanism 56]
(A-1-4-1. Overview of Gas Exhaust Mechanism 56)

The gas exhaust mechanism 56 is a mechanism that discharges the fuel 500 (gaseous fuel) vaporized (or evaporated) in the tank 50, and delivers the fuel to an intake system 32 of the engine 20. As shown in FIG. 1, the gas exhaust mechanism 56 has piping 90 (hereinafter also referred to as "purge line 90."), a second rollover valve 92, a canister 94, a regulating valve 96, and a dust filter 98.

The second rollover valve 92 automatically shuts off fuel when the vehicle 10 rolls over. The canister 94 adsorbs the vaporized fuel 500. The regulating valve 96 of the first embodiment is used to control (positive pressure control) an internal pressure Pi of the fuel tank 50, and to control (negative pressure control) pressure (negative pressure) when sucking the fuel 500 adsorbed in the canister 94 into the engine 20 side. The regulating valve 96 of the first embodiment is a solenoid valve, and is controlled by an engine ECU 116, for example. Hereinafter, the regulating valve 96 is also referred to as a PCS valve 96. PCS stands for purge control solenoid.

[A-1-5. Purge Line Monitoring System 30]
(A-1-5-1. Overview of Purge Line Monitoring System 30)

Figure 2:
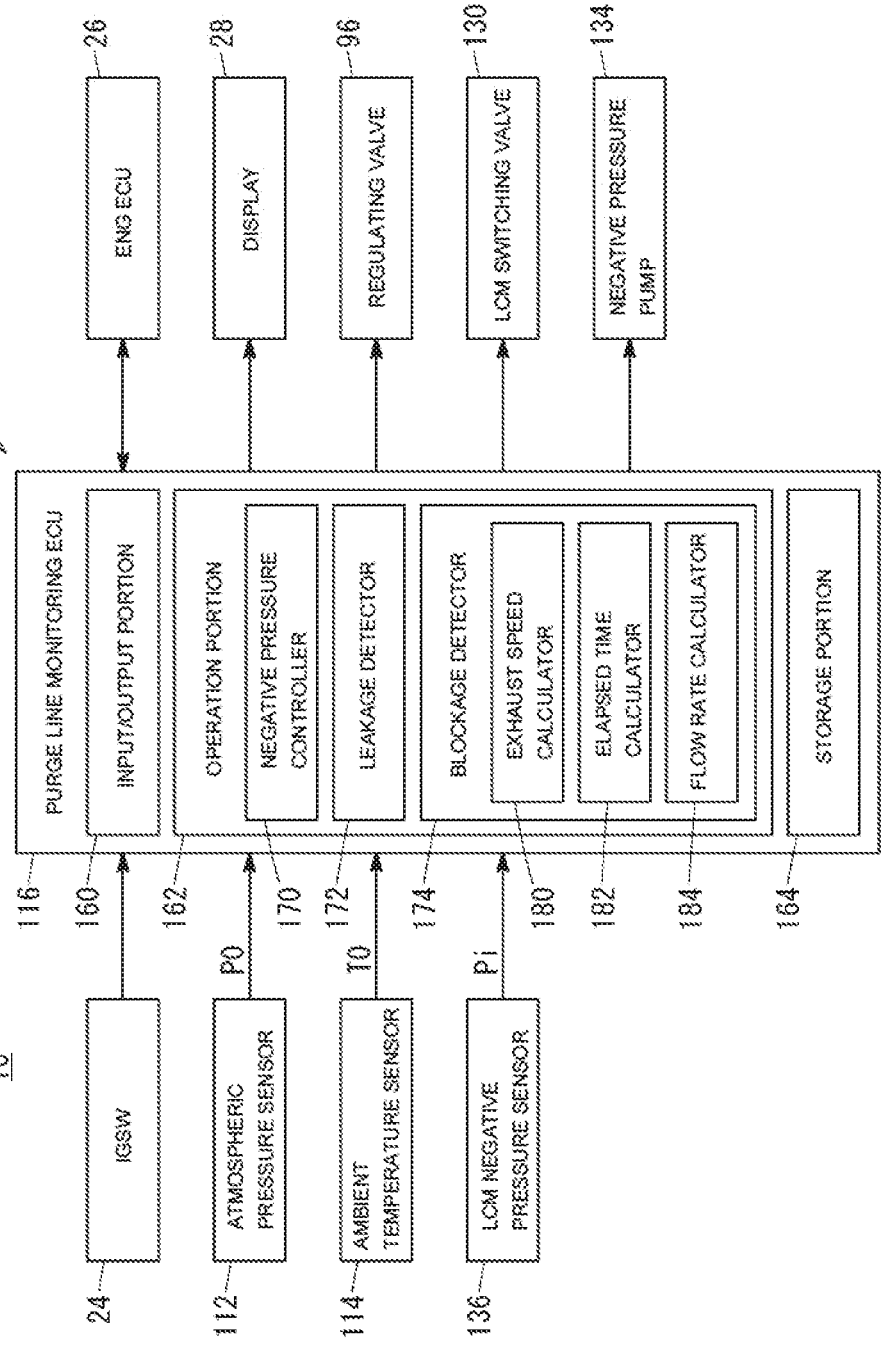
FIG. 2 is a block diagram showing a control system of the purge line monitoring system of the first embodiment.

FIG. 2 is a block diagram showing a control system of the purge line monitoring system 30 of the first embodiment. The purge line monitoring system 30 monitors the purge line 90 for any leakage or blockage. The monitoring system 30 has a leak check module 110 (hereinafter also referred to as "LCM 110." FIG. 1), an atmospheric pressure sensor 112 (FIG. 2), an ambient temperature sensor 114 (FIG. 2), and a purge line monitoring electronic control unit 116 (hereinafter referred to as "purge line monitoring ECU 116," "monitoring ECU 116," or "ECU 116." FIGS. 1 and 2).

(A-1-5-2. LCM 110)

Figure 3:
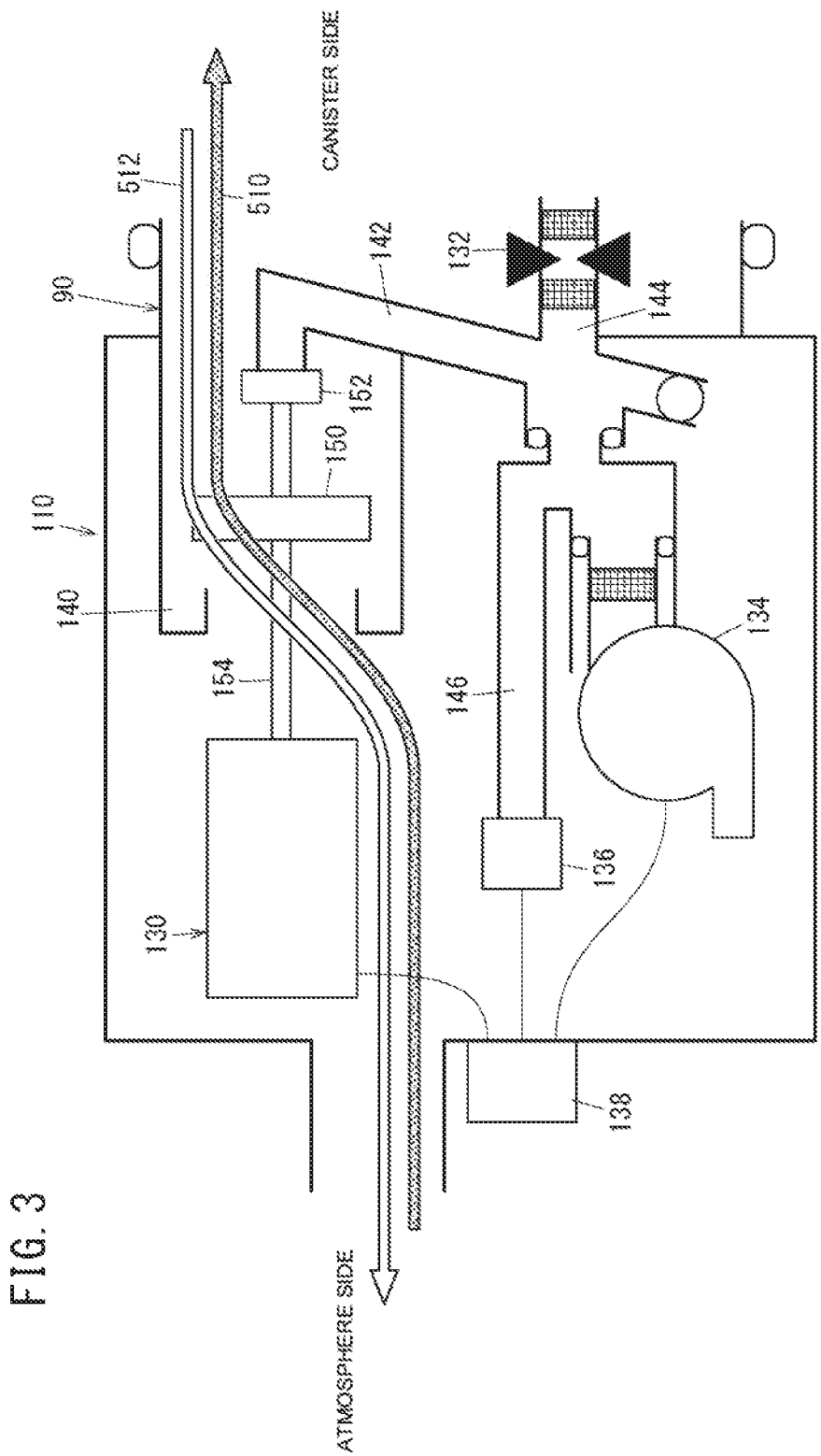
FIG. 3 is a diagram showing a normal operation of a leak check module (LCM) and the flow of an inner fluid of the first embodiment.

FIG. 3 is a diagram showing a normal operation of the LCM 110 and the flow of an inner fluid Fi of the first embodiment. In this case, the inner fluid Fi is a fluid that contains air and the vaporized fuel 500. In FIG. 3, arrow 510 indicates the flow of the inner fluid Fi when it is purged, and arrow 512 indicates the flow of the inner fluid Fi when fueling.

Figure 4:
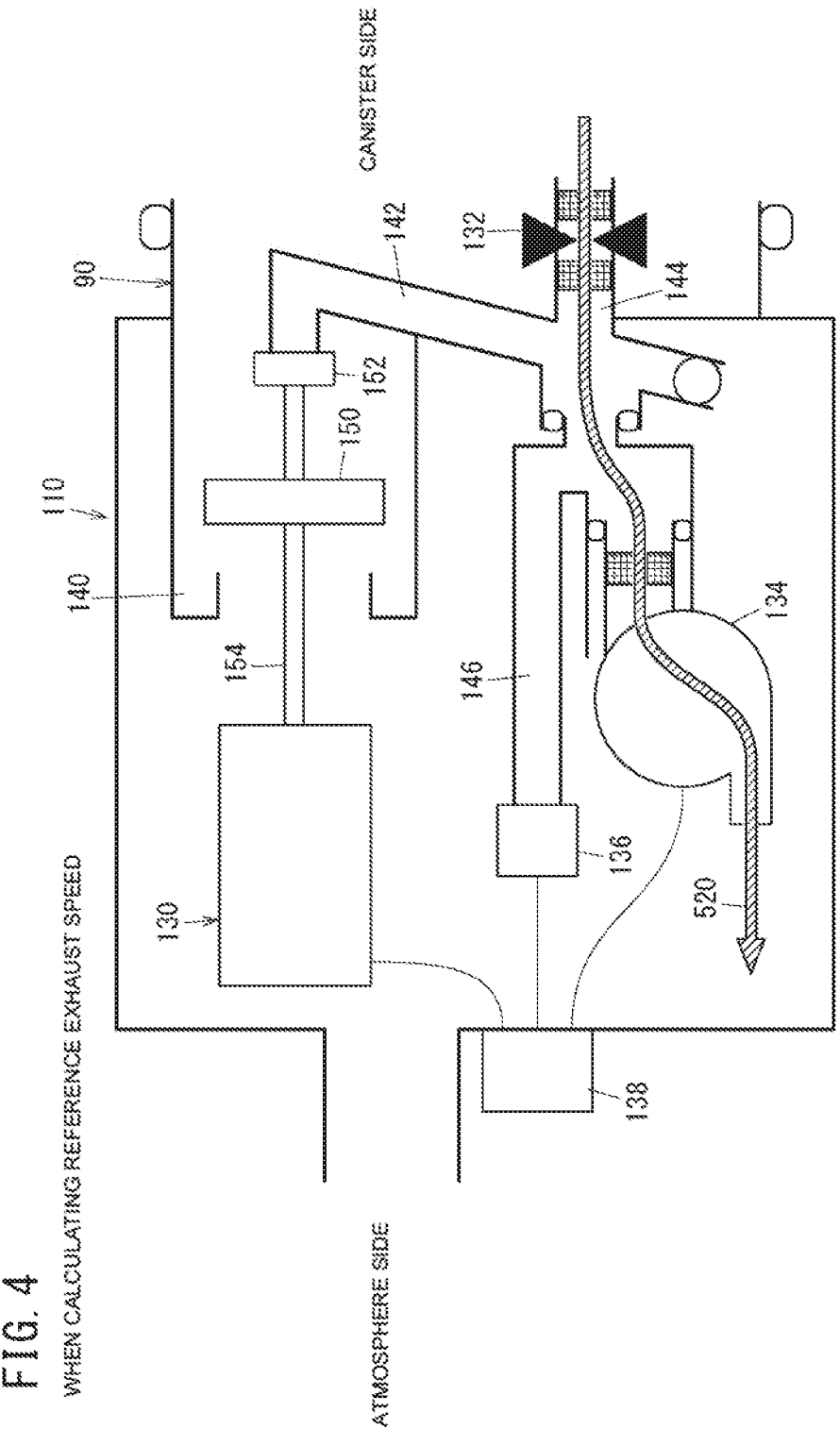
FIG. 4 is a diagram showing a first example of the operation of the LCM and the flow of the inner fluid, during a purge line blockage diagnosis of the first embodiment (when calculating a reference exhaust speed).

FIG. 4 is a diagram showing a first example of the operation of the LCM 110 and the flow of the inner fluid Fi, during a purge line blockage diagnosis of the first embodiment (when calculating a reference exhaust speed Qref). In FIG. 4, arrow 520 indicates the flow of the inner fluid Fi in the first example.

Figure 5:
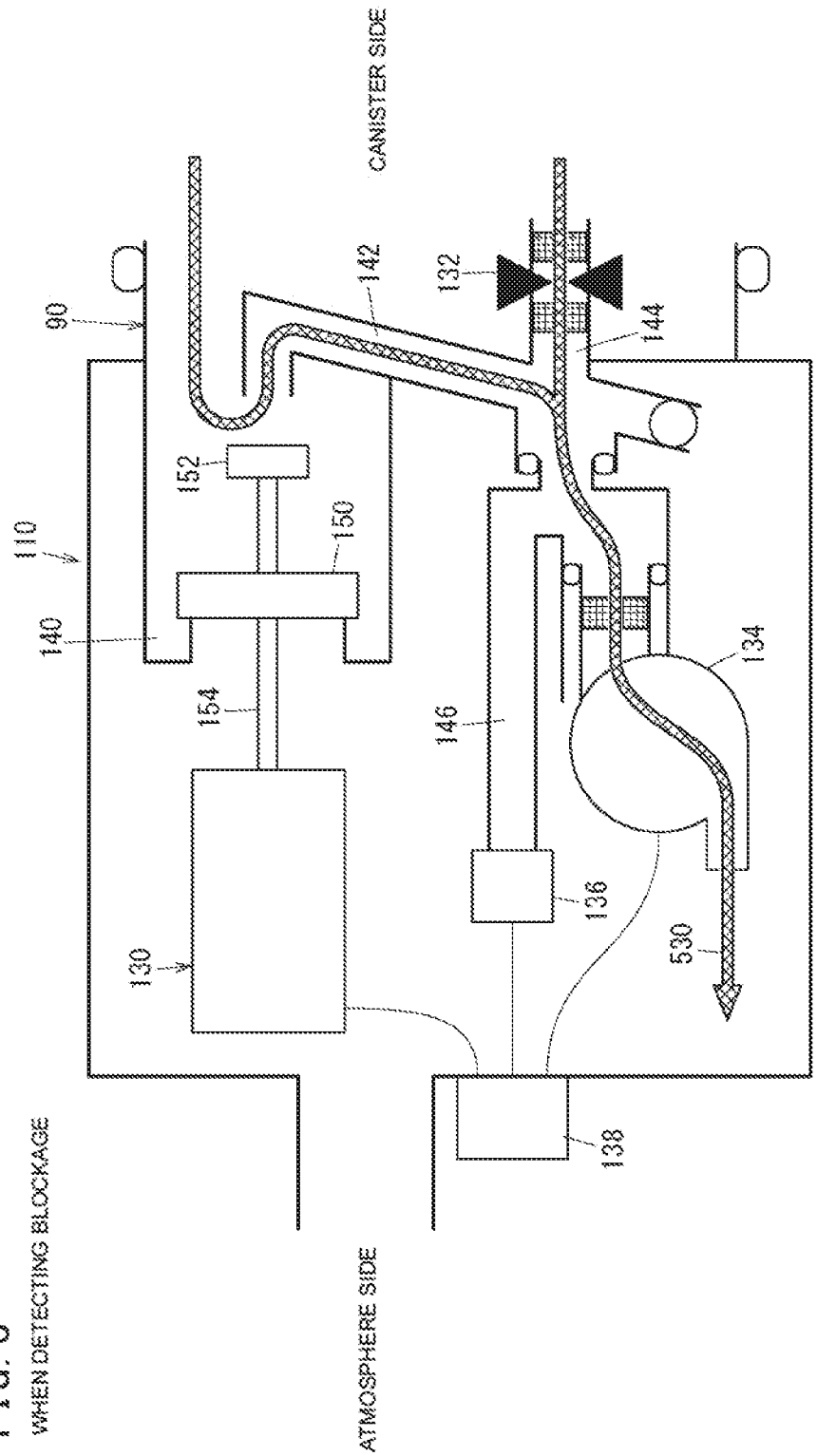
FIG. 5 is a diagram showing a second example of the operation or the LCM and the flow of the inner fluid, during the purge line blockage diagnosis of the first embodiment (when calculating a detected displacement).

FIG. 5 is a diagram showing a second example of the operation of the LCM 110 and the flow of the inner fluid Fi, during the purge line blockage diagnosis of the first embodiment (when calculating a displacement V). In FIG. 5, arrow 530 indicates the flow of the inner fluid Fi in the second example.

As shown in FIGS. 3 to 5, the LCM 110 has a switching valve 130, a reference orifice 132, a negative pressure pump 134, an internal pressure sensor 136, a connector 138, a main channel 140, a first bypass channel 142, a second bypass channel 144, and a third bypass channel 146.

The switching valve 130 (hereinafter also referred to as "LCM switching valve 130" or "LCM solenoid valve 130,") is a valve that switches the flow of the inner fluid Fi, and is formed in the middle of the purge line 90. This switching valve 130 of the first embodiment is a solenoid valve, and includes a first closing portion 150, a second closing portion 152, and a support bar 154.

The first closing portion 150 switches between open and closed states of the main channel 140 of the purge line 90. When the first closing portion 150 is open, the inner fluid Fi passes through the LCM 110 via the main channel 140, as indicated by arrows 510, 512 of FIG. 3. The main channel 140 is a channel through which the inner fluid Fi passing through the purge line 90 mainly passes in the LCM 110.

Meanwhile, when the first closing portion 150 is closed and the negative pressure pump 134 is operating, the inner fluid Fi passes through the LCM 110 via the first bypass channel 142, as indicated by arrow 530 of FIG. 5. The first bypass channel 142 is a channel extending from a part closed by the first closing portion 150, to a junction with the second bypass channel 144, The second bypass channel 144 is a channel from the orifice 132 to the negative pressure pump 134.

The second closing portion 152 switches between open and closed states of the first bypass channel 142. When the second closing portion 152 is closed, the inner fluid Fi does not enter the first bypass channel 142, as indicated by arrows 510, 512 of FIG. 3 (first bypass channel 142 is closed.). Meanwhile, when the second closing portion 152 is open and the negative pressure pump 134 is operating, the inner fluid Fi passes through the LCM 110 via the first bypass channel 142, as indicated toy arrow 530 of FIG. 5.

The support bar 154 supports the first closing portion 150 and the second closing portion 152. Accordingly, in the first embodiment, the second closing portion 152 is closed when the first closing portion 150 is open, and the second closing portion 152 is open when the first closing portion 150 is closed, except during displacement of the support bar 154.

The reference orifice 132 (hereinafter also referred to as "orifice 132.") connects the purge line 90 (main channel 140) and the second bypass channel 144.

The negative pressure pump 134 is a negative pressure source that generates a negative pressure based on an instruction from the monitoring ECU 116, and may be a vane pump, for example. In the first embodiment, an inlet of the negative pressure pump 134 faces the second bypass channel 144. Hence, when the second closing portion 152 is closed, the inlet of the negative pressure pump 134 is cut off from the purge line 90 (main channel 140). Additionally, an outlet of the negative pressure pump 134 is connected to the main channel 140. Hence, the inner fluid Fi having passed the negative pressure pump 134 joins the main channel 140.

Note that the inner fluid Fi having passed the negative pressure pump 134 may be discharged to the outside without joining the main channel 140. In this case, a dust filter (second dust filter) different from the dust filter 98 is arranged on the outlet side of the negative pressure pump 134.

The internal pressure sensor 136 (hereinafter also referred to as "LCM negative pressure sensor 136.") detects a negative pressure (hereinafter also referred to as "internal pressure Pi.") [Pa] generated by the negative pressure pump 134. In the first embodiment, the internal pressure sensor is arranged on the tip end of the third bypass channel 146 that branches from the second bypass channel 144. Otherwise, the internal pressure sensor 136 may be arranged in the first bypass channel 142 or the second bypass channel 144. The connector 138 is used to connect the monitoring ECU 116 with the switching valve 130, the negative pressure pump 134, and the internal pressure sensor 136.

Note that a configuration described in Japanese Patent Application Publication No. 2006-037752 may be used as the basic configuration of the LCM 110.

(A-1-5-3. Atmospheric Pressure Sensor 112 and Ambient Temperature Sensor 114)

The atmospheric pressure sensor 112 is arranged in a place (e.g., a place in an engine room that is spaced away from the engine 20) less likely to be affected by waste heat of the engine 20, and detects an atmospheric pressure P0 [Pa]. The ambient temperature sensor 114 is arranged in a place (e.g., a place in the engine room that is spaced away from the engine 20) less likely to be affected by waste heat of the engine 20, and detects an ambient temperature T0 [° C.].

(A-1-5-4. Purge Line Monitoring ECU 116)
(A-1-5-4-1. Overview of Monitoring ECU 116)

The monitoring ECU 116 determines whether any leakage or blockage has occurred in the purge line 90. In other words, the ECU 116 performs purge line leakage diagnosis control of diagnosing leakage in the purge line 90, and purge line blockage diagnosis control of diagnosing blockage in the purge line 90. As shown in FIG. 2, the ECU 116 has an input/output portion 160, an operation portion 162, and a storage portion 164.

(A-1-5-4-2. Input/Output Portion 160)

The input/output portion 160 exchanges signals between the monitoring ECU 116 and other parts (e.g., engine ECU 26).

(A-1-5-4-3. Operation Portion 162)

The operation portion 162 controls parts of the purge line monitoring system 30 by executing a program stored in the storage portion 164, and is configured of a central processing unit (CPU), for example. As shown in FIG. 2, the operation portion 162 includes a negative pressure controller 170, a leakage determination portion 172, and a blockage determination portion 174.

The negative pressure controller 170 controls the negative pressure (internal pressure Pi) supplied to the purge line 90 from the negative pressure pump 134 as a negative pressure source. The leakage determination portion 172 determines whether a leakage is present in the purge line 90, by using the switching valve 130, the negative pressure pump 134, and the internal pressure sensor 136. A technique described in Japanese Patent Application Publication No. 2006-037752, for example, may be used for leakage detection by the leakage determination portion 172.

The blockage determination portion 174 determines whether a blockage is present in the purge line 90, and has an exhaust speed calculator 180, an elapsed time calculator 182, and a flow rate calculator 184. The exhaust speed calculator 180 calculates the reference exhaust speed Qref [L/sec] of the inner fluid Fi during operation of the negative pressure pump 134. The elapsed time calculator 182 calculates an elapsed time Δt [sec] from a time point when the internal pressure Pi of the purge line 90 is a first pressure value P1. The flow rate calculator 184 calculates a flow rate V (hereinafter also referred to as "displacement V.") [L] of the inner fluid Fi, on the basis of the reference exhaust speed Qref and the elapsed time Δt. Details of processing of the blockage determination portion 174 will be described later with reference to FIGS. 8 to 12.

(A-1-5-4-4. Storage Portion 164)

The storage portion 164 (FIG. 2) stores a program and data used by the operation portion 162. The storage portion 164 includes a random access memory (hereinafter referred to as "RAM."), for example. A volatile memory such as a register, and a nonvolatile memory such as a flash memory may be used as the RAM. In addition to the RAM, the storage portion 164 may also have a read only memory (hereinafter referred to as "ROM.").

Note that in the first embodiment, the program and data used by the operation portion 162 are assumed to be stored in the storage portion 164 of the vehicle 10. However, part of the program and data may by acquired from an external server (not shown), through radio equipment (not shown) included in the input/output portion 160, for example. Moreover, the monitoring ECU 116 may be a combination of multiple ECUs.

<A-2. Purge Line Blockage Diagnosis Control>
[A-2-1. Principle of Purge Line 90 Blockage Detection]
(A-2-1-1. Overview of Detection Principle)

Before going into a detailed description of purge line blockage diagnosis control (hereinafter also referred to as "blockage diagnosis control."), a description will be given of the principle of detecting blockage in the purge line 90.

As described above, it is determined whether a blockage is present in the purge line 90 in purge line blockage diagnosis control. If the negative pressure pump 134 is producing a constant output during operation, the volume on which negative pressure is applied is smaller when the purge line 90 is blocked, as compared to when the purge line 90 is not blocked. Hence, decompression is more rapid and the flow rate V is reduced when the purge line 90 is blocked. Blockage diagnosis control uses this to diagnose blockage in the purge line 90.

More specifically, before detecting the detected flow rate V, the ECU 116 calculates the reference exhaust speed Qref. The reference exhaust speed Qref is a flow speed (predicted value) [L/sec] that is likely to occur when the purge line 90 is decompressed by use of the negative pressure pump 134.

The reference exhaust speed Qref is obtained by converting, by use of Bernoulli's principle, an exhaust speed at which the inner fluid Fi is sucked in through the orifice 132 alone, into an exhaust speed at which the inner fluid is sucked in through the purge line 90 (first bypass channel 142 and orifice 132). This conversion uses a pressure difference (atmospheric pressure P0-internal pressure Pi) resulting from sucking in the inner fluid Fi through the orifice 132 alone, the ambient temperature T0, and the atmospheric pressure P0 (details will be given later with reference to FIG. 9).

After obtaining the reference exhaust speed Qref, the ECU 116 sucks in the inner fluid Fi through the purge line 90 (first bypass channel 142 and orifice 132). At this time, it is possible to calculate or estimate the flow rate V (displacement) at which the inner fluid Fi passes through the purge line 90, by using the reference exhaust speed Qref and the elapsed time Δt of decompression, for example. Hence, it is possible to detect blockage in the purge line 90 based on whether the flow rate V is equal to or higher than a flow rate threshold THv. The flow rate threshold THv (hereinafter also referred to as "threshold THv.") is a value that is set on the basis of a design value or a simulation result, and is used to determine whether a blockage is present.

(A-2-1-2. Normal Operation)

For the sake of better understanding, first, the operation of the LCM 110 and the flow of the inner fluid Fi during normal operation of the first embodiment will be described. In this description, normal operation refers to operation when the LCM 110 is not used for anomaly detection. Normal operation does not include operation during diagnosis of blockage in the purge line 90.

As shown in FIG. 3, during normal operation, the first bypass channel 142 is closed by the second closing portion 152 of the switching valve 130, and the negative pressure pump 134 is stopped. Hence, the inner fluid Fi simply passes through the purge line 90 (main channel 140), as indicated by arrow 510 or 512.

(A-2-1-3. When Calculating Reference Exhaust Speed Qref)

(A-2-1-3-1. Overview)

Figure 6:
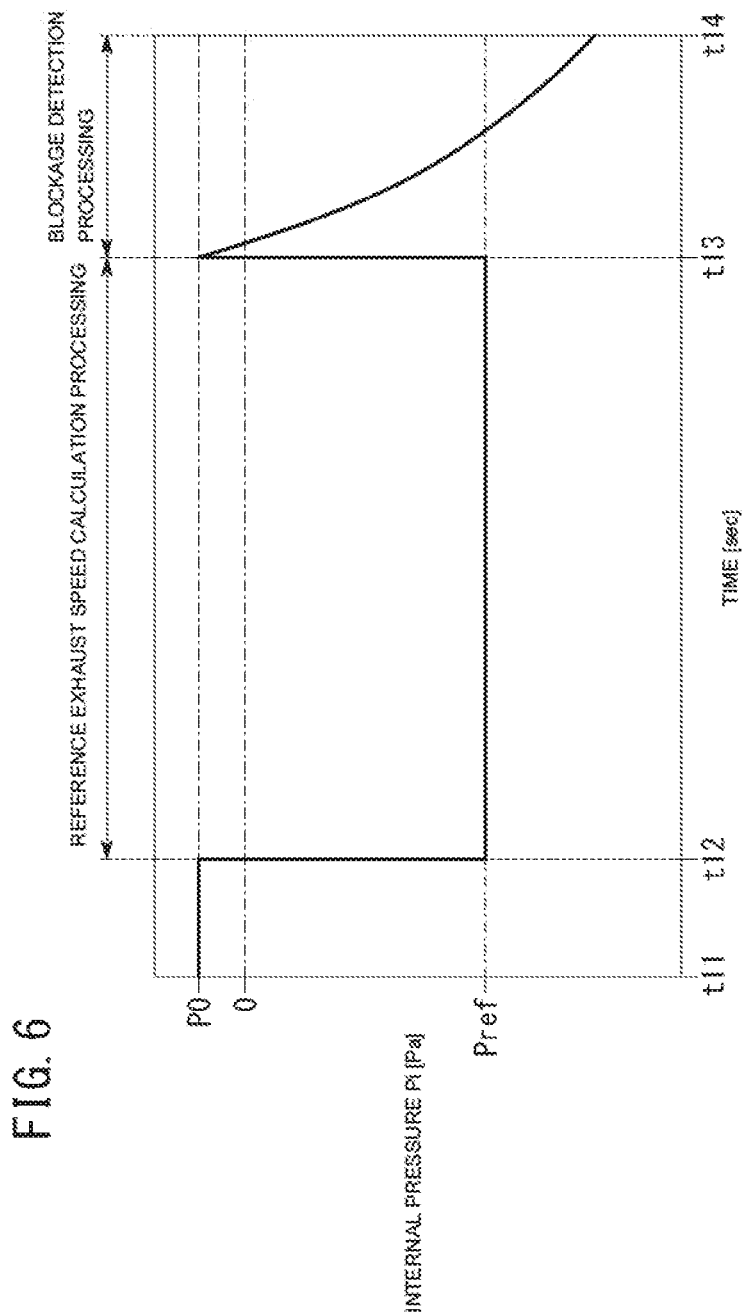
FIG. 6 is a time chart showing an example of a pressure (internal pressure) of a purge line, under purge line blockage diagnosis control of the first embodiment.

FIG. 6 is a time chart showing an example of the internal pressure Pi, under purge line blockage diagnosis control of the first embodiment. In FIG. 6, time point t11 to t12 is during normal operation, time point t12 to t13 is when calculating the reference exhaust speed Qref (during later-mentioned reference exhaust speed calculation processing), and time point t13 to t14 is when calculating the displacement V (during later-mentioned blockage detection processing).

As shown in FIG. 4, when calculating the reference exhaust speed Qref of the purge line 90, the first bypass channel 142 is closed by the second closing portion 152 of the switching valve 130, while the negative pressure pump 134 is activated. Hence, the negative pressure (internal pressure Pi) generated by the negative pressure pump 134 causes fresh air to be sucked into the LCM 110 (second bypass channel 144) through the orifice 132, as indicated by arrow 520 (time point t12 to t13 of FIG. 6).

Since the switching valve 130 closes the first bypass channel 142, the inner fluid Fi is not sucked in through the main channel 140. In other words, the switching valve 130 cuts the purge line 90 off from the inlet of the negative pressure pump 134. Accordingly, the detected value (internal pressure Pi) of the internal pressure sensor 136 indicates a pressure (hereinafter also referred to as "reference pressure value Pref.") of the inner fluid Fi when it is sucked in.

A diameter d of the hole of the orifice 132 is known. Hence, the reference exhaust speed Qref can be calculated by use of the following equation (1).

[Expression 1]

$$Qref = \frac{\pi d^2}{4} \times A \frac{\sqrt{2\Delta P}}{\rho} \quad (1)$$

Values of equation (1) are as follows.
π: circular constant
d: diameter [m] of orifice 132
A: flow coefficient
ΔP: pressure difference [Pa]
ρ: air density [g/m³]

The flow coefficient A is a coefficient for correcting a theoretical flow rate to obtain, the actual flow rate V. As will be described later, the flow coefficient A may be varied according to the internal pressure Pi. The pressure difference ΔP is the difference P0–Pi) between the atmospheric pressure P0 and the internal pressure Pi. The air density ρ is calculated by the following equation (2).

[Expression 2]

$$\rho = \frac{P0}{R \times (T0 + 273.15)} \quad (2)$$

Values of equation (2) are as follows.
P0; atmospheric pressure [Pa]
R: gas constant of dry air (=2.87)
T0: ambient temperature [° C.]
273.15; value for converting Celsius to Kelvin As has been described, the reference exhaust speed Qref of the purge line 90 can be calculated by use of the equations (1) and (2).

(A-2-1-3-2. Flow Coefficient A)

Figure 7:
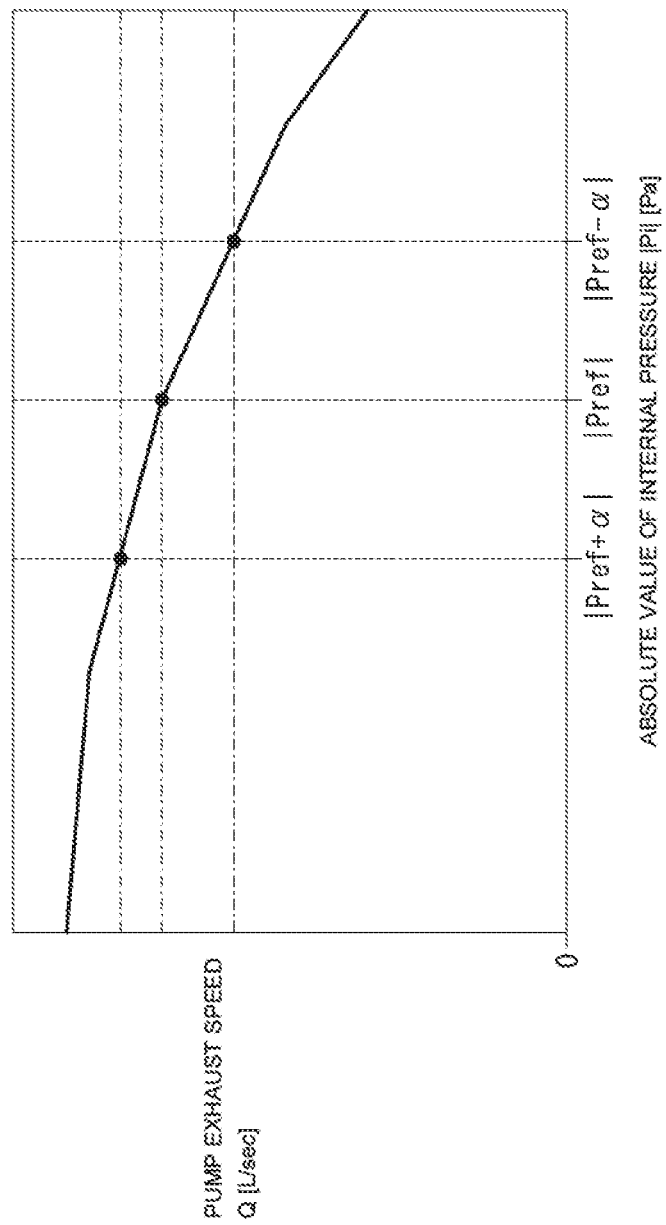
FIG. 7 is a diagram showing an example of a relation between an absolute value of the pressure (internal pressure) of the purge line and an exhaust speed, under the purge line blockage diagnosis control of the first embodiment.

FIG. 7 is a diagram showing an example of a relation between an absolute value of pressure (internal pressure Pi) of the purge line 90 and an exhaust speed Q, under the purge line blockage diagnosis control of the first embodiment. As shown in FIG. 7, when the absolute value of the internal pressure Pi as a negative pressure increases, the exhaust speed Q (pump exhaust speed Q) of the negative pressure pump 134 tends to decrease. For this reason, the ECU 116 can vary the flow coefficient A of equation (1) according to the internal pressure Pi.

Specifically, a person in charge stores the relation between the internal pressure Pi and the flow coefficient A beforehand in the storage portion 164. Then, the ECU 116 reads the flow coefficient A corresponding to the internal pressure Pi from the storage portion 164, and substitutes the value into equation (1).

Note, however, that the flow coefficient A may be a fixed value.

(A-2-1-4. When Calculating Displacement V of Purge Line 90)

As shown in FIG. 5, when calculating the displacement V, the first bypass channel 142 is opened by the switching valve 130, and the negative pressure pump 134 is activated. Hence, the negative pressure generated by the negative pressure pump 134 causes the inner fluid Fi to be sucked to the negative pressure pump 134 side through the orifice 132 and the first bypass channel 142, as indicated by arrow 530.

Accordingly, the detected value (internal pressure Pi) of the internal pressure sensor 136 indicates the pressure of the inner fluid Fi in the purge line 90 when it is sucked in.

As described above, the reference pressure value Pref is detected by the operation of FIG. 4. Hence, the displacement V can be calculated by use of the following equation (3).

[Expression 3]

$$V = \frac{P0}{P1 - P2} \times Qref \times \Delta t \quad (3)$$

Values of equation (3) are as follows,

P0: atmospheric pressure [Pa]

P1: first pressure value [Pa]

P2: second pressure value [Pa]

Qref: reference exhaust speed [L/sec]

$\Delta t$: elapsed time [sec] after time point when internal pressure Pi is first pressure value P1

The first pressure value P1 is the internal pressure Pi in a first state, and, in the first embodiment, is a value (fixed value) obtained by adding a positive predetermined value $\alpha$ to the reference pressure value Pref (P1=Pref+$\alpha$). The second pressure value P2 is the internal pressure Pi in a second state different from the first state, and, in the first embodiment, is a value (fixed value) obtained by subtracting the positive predetermined value $\alpha$ from the reference pressure value Pref (P2=Pref−$\alpha$). The predetermined value $\alpha$ is a value for setting a pressure range that enables detection of a flow rate V required to diagnose blockage in the purge line 90. Note that the first pressure value P1 and the second pressure value P2 are negative pressures (negative values).

The specification of the fuel storage system 22 is determined in the design stage. A theoretical value of the displacement V can be calculated by using the specification of the fuel storage system 22. Alternatively, it is possible to know a possible range of the displacement V beforehand, by a simulator or an actually measured value. For this reason, in the first embodiment, the flow rate threshold THv is set on the basis of the displacement V (flow rate) thus calculated or acquired beforehand. Instead of directly using the theoretical value, simulation value, or actually measured value, the flow rate threshold THv may be a value obtained by adding to these values an allowance value that takes into account errors.

Then, a blockage in the purge line 90 is detected by comparing the displacement V and the flow rate threshold THv. Specifically, if the purge line 90 is not blocked, time (elapsed time $\Delta t$) required for decompression from the first pressure value P1 to the second pressure value P2 is relatively long. Otherwise, the flow rate V from the first pressure value P1 to the second pressure value P2 Is relatively large. In these cases, the displacement V exceeds the threshold THv, so that it can be determined that the purge line 90 is not blocked.

On the other hand, if the purge line 90 is blocked, time (elapsed time $\Delta t$) required for decompression from the first pressure value P1 to the second pressure value P2 is relatively short. Otherwise, the flow rate V from the first pressure value P1 to the second pressure value P2 is relatively small. In these cases, the displacement V fails below the threshold THv, so that it can be determined that the purge line 90 is blocked.

[A-2-2. Overall Flow of Purge Line Blockage Diagnosis Control]

Figure 8:
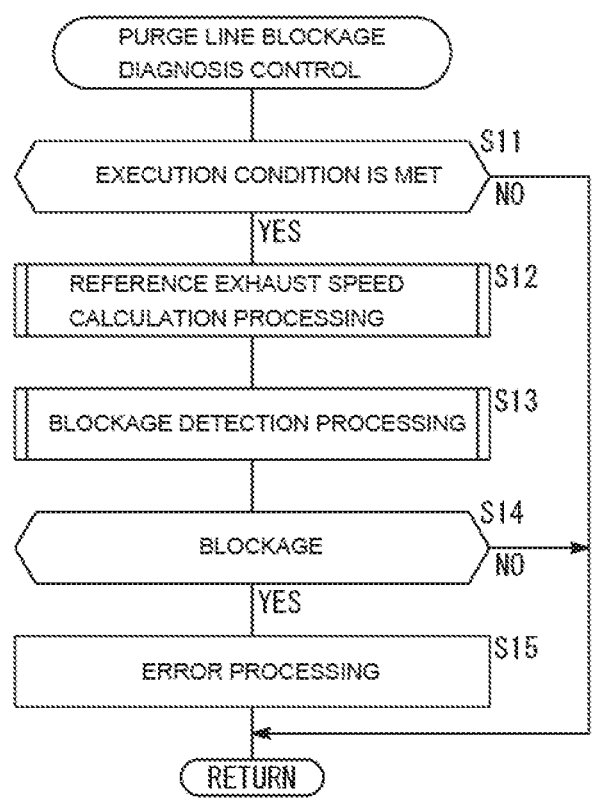
FIG. 8 is a flowchart of the purge line blockage diagnosis control of the first embodiment.

FIG. 8 is a flowchart of the purge line blockage diagnosis control of the first embodiment. The blockage determination portion 174 and the negative pressure controller 170 of the monitoring ECU 116 execute steps S11 to S15 of FIG. 8. In step S11, the monitoring ECU 116 determines whether an execution condition for reference exhaust speed calculation processing (S12) and blockage detection processing (S13) is met. An example of the execution condition is the elapse of a predetermined period (e.g., any value ranging from several minutes to several hours) after the IGSW 24 is turned off. If the execution condition is met (S11: YES), the processing proceeds to step S12, and if the execution condition is not met (S11: NO), the current processing is terminated, and step S11 is executed again after the elapse of a certain time period.

In step S12, the ECU 116 performs reference exhaust speed calculation processing. Reference exhaust speed calculation processing is processing of calculating the reference exhaust speed. Qref for determining whether a blockage is present in the purge line 90. The ECU 116 calculates the reference exhaust speed Qref by use of the LCM 110. Details of reference exhaust speed calculation processing will be described later with reference to FIG. 9 and other drawings.

In step S13, the ECU 116 performs blockage detection processing. Blockage detection processing is processing of detecting blockage in the purge line 90 by using the reference exhaust speed Qref calculated in step S12. The ECU 116 performs blockage detection processing by use of the LCM 110. Details of blockage detection processing will be described later with reference to FIG. 10 and other drawings.

If the ECU 116 determines as a result of blockage detection processing that a blockage has occurred (S14: YES), in step S15, the ECU 116 performs error processing associated with the blockage. For example, the ECU 116 displays a warning message on the display 28. The ECU 116 may also store a failure cods in the storage portion 164. If it is determined that no blockage has occurred (S14: NO), the current processing is terminated, and step S11 is executed again after the elapse of a certain time period.

[A-2-3. Reference Exhaust Speed Calculation Processing]

Figure 9:
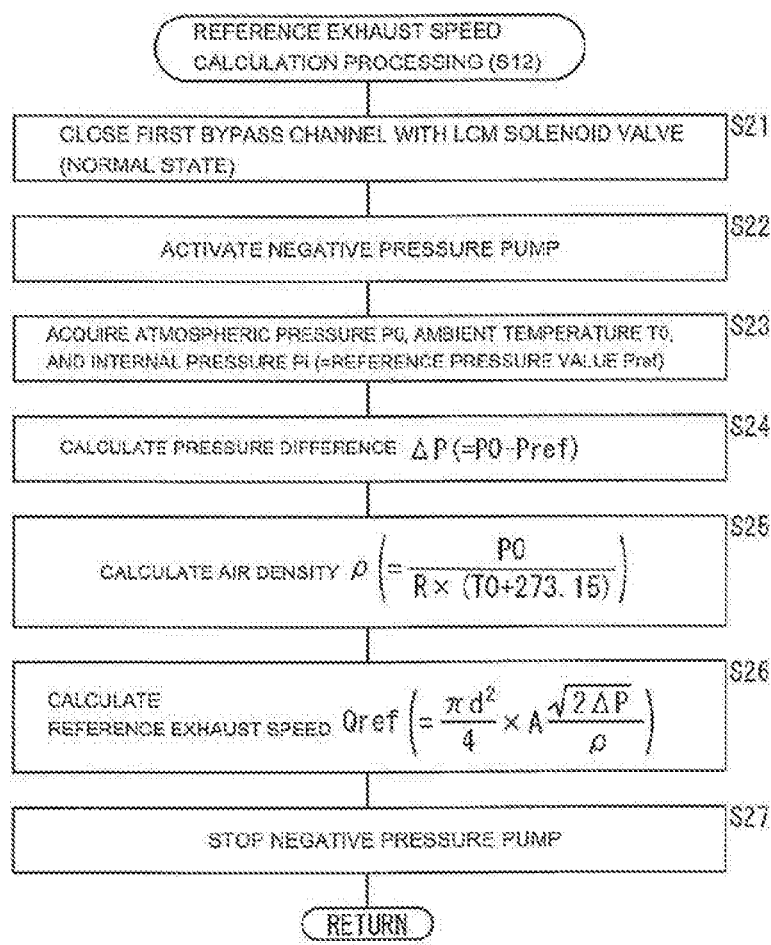
FIG. 9 is a flowchart of reference exhaust speed calculation processing (details of S12 of FIG. 8) of the first embodiment.

FIG. 9 is a flowchart of reference exhaust speed calculation processing (details of S12 of FIG. 8) of the first embodiment. In step S21, the ECU 116 closes the first bypass channel 142 with the second closing portion 152 of the LCM solenoid valve 130 (FIG. 4). Note that closing of the first bypass channel 142 is the same as in the normal state (FIG. 3), as mentioned earlier.

In step S22, the blockage determination portion 174 of the ECU 116 activates the negative pressure pump 134 through the negative pressure controller 170. In the first embodiment, there are only two kinds of operational control of the negative pressure pump 134, which are ON and OFF, and the ON state (output) of the negative pressure pump 134 is not divided into multiple levels. Instead, the ON state (output) of the negative pressure pump 134 may be divided into multiple levels.

In step S23, the ECU 116 acquires the atmospheric pressure P0 from the atmospheric pressure sensor 112, the ambient temperature T0 from, the ambient temperature sensor 114, and the internal pressure Pi from the internal pressure sensor 136. Note that the internal pressure Pi is acquired as a value at time point t12 to t13 in FIG. 6, and then is used as the reference pressure value Pref. In step S24 of FIG. 9, the ECU 116 calculates the pressure difference $\Delta P$ (=P0−Pref) between the atmospheric pressure P0 and the reference pressure value Pref.

In step S25, the ECU 116 calculates the air density ρ by use of the atmospheric pressure P0 and the ambient temperature T0 (see aforementioned equation (2)). In step S26, the ECU 116 calculates the reference exhaust speed Qref by use of the pressure difference ΔP and the air density ρ, for example (see aforementioned equation (1)). As described above, the flow coefficient A of equation (1) may be a variable value depending on the internal pressure Pi (=reference pressure value Pref). In step S27, the ECU 116 stops the negative pressure pump 134.

[A-2-4. Blockage Detection Processing]

Figure 10:
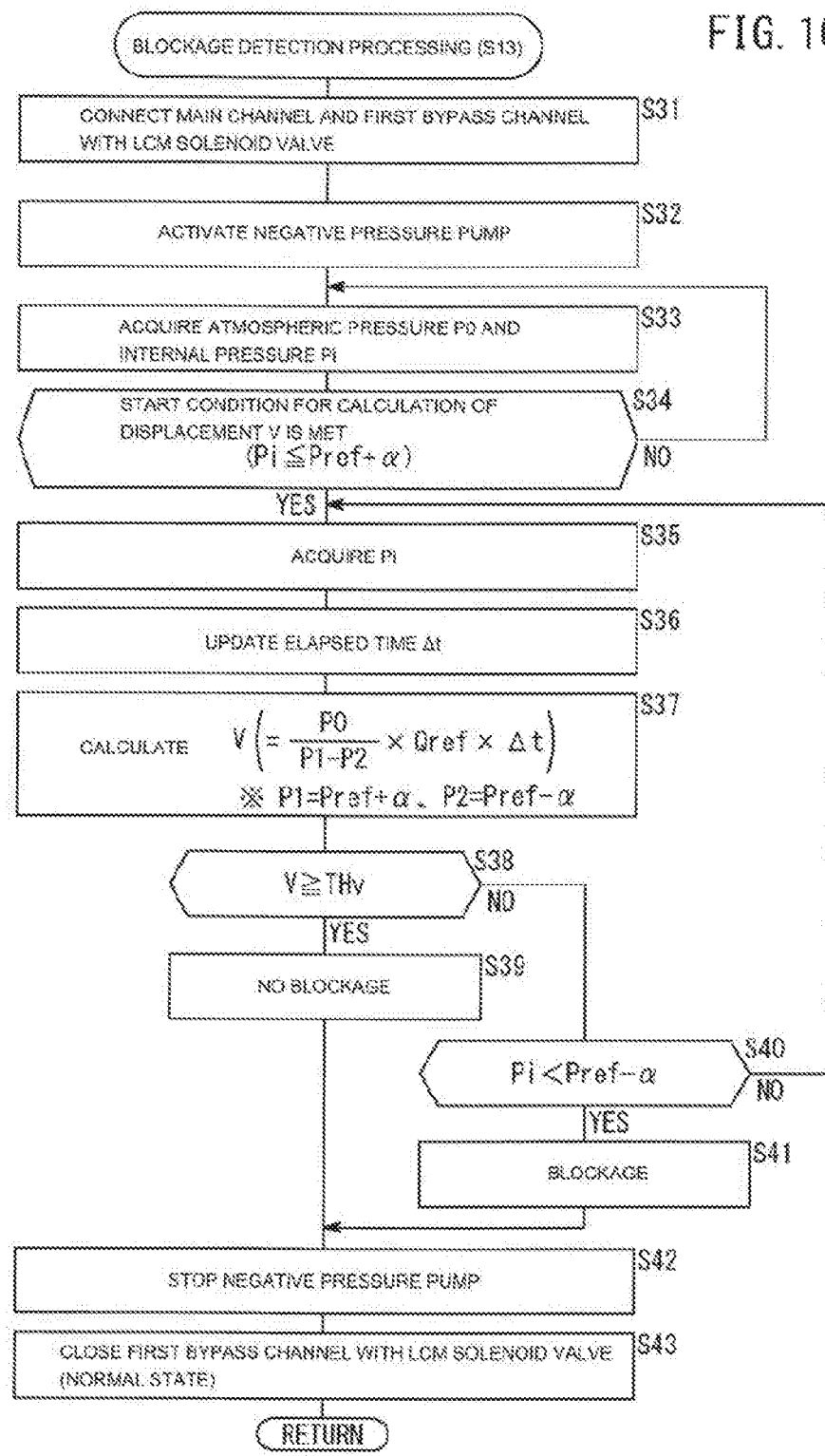
FIG. 10 is a flowchart of blockage detection processing (details of S13 of FIG. 8) of the first embodiment.

FIG. 10 is a flowchart of blockage detection processing (details of S13 of FIG. 8) of the first embodiment. In step S31, the ECU 116 interrupts the main channel 140 with the first closing portion 150 of the LCM solenoid valve 130, while connecting the main channel 140 and the first bypass channel 142 with the second closing portion 152 (FIG. 5). In step S32, the ECU 116 activates the negative pressure pump 134. As described above, in the first embodiment, there are only two kinds of operational control of the negative pressure pump 134, which are ON and OFF. In step S33, the ECU 116 acquires the atmospheric pressure P0 from the atmospheric pressure sensor 112, and the internal pressure Pi from the internal pressure sensor 136.

In step S34, the ECU 116 determines whether a start condition for calculation of the displacement V is met. Specifically, the ECU 116 determines whether the internal pressure Pi is equal to or lower than a sum Pref+α of the reference pressure value Pref (S23 of FIG. 9) and a predetermined value α. If the start condition is not met (S34: NO), the processing returns to step S33. If the start condition is met (S34: YES), in step S35, the ECU 116 acquires (or updates) the internal pressure Pi.

In step S36, the ECU 116 updates the elapsed time Δt after the start of calculation of the displacement V. For example, the elapsed time Δt is increased by a predetermined value every time step S36 is repeated. In step S37, the ECU 116 calculates the displacement V (see aforementioned equation (3)) based on the reference exhaust speed Qref, the elapsed time Δt, the atmospheric pressure P0, and the reference pressure value Pref.

In step S38, the ECU 116 determines whether the displacement V is equal to or higher than the threshold THv. If the displacement V is equal to or higher than the threshold THv (S38: YES), in step S39, the ECU 116 determines that no blockage has occurred in the purge line 90. If the displacement V is not equal to or higher than the threshold THv (S38: NO), the processing proceeds to step S40.

In step S40, the ECU 116 determines whether the infernal pressure Pi acquired in step S35 is lower than a difference Pref−α between the reference pressure value Pref and the predetermined value α. If the internal pressure Pi is not lower than the difference between the reference pressure value Pref and the predetermined value α (S40: NO), the processing returns to step S35. If the internal pressure Pi is lower than the difference between the reference pressure value Pref and the predetermined value α (S40: YES), in step S41, the ECU 116 determines that a blockage has occurred in the purge line 90.

After step S39 or S41, in step S42, the ECU 116 stops the negative pressure pump 134. In step S43, the ECU 116 cancels the interruption of the main channel 140 by the first closing portion 150 of the LCM solenoid valve 130, while closing the first bypass channel 142 with the second closing portion 152 (FIG. 3). Thus, the purge line 90 is brought back to the normal state (FIG. 3).

[A-2-5. Comparison of Case Where Blockage is Present and Case Where Blockage is Absent]

(A-2-5-1. Example of Case Where Blockage is Absent)

Figure 11:
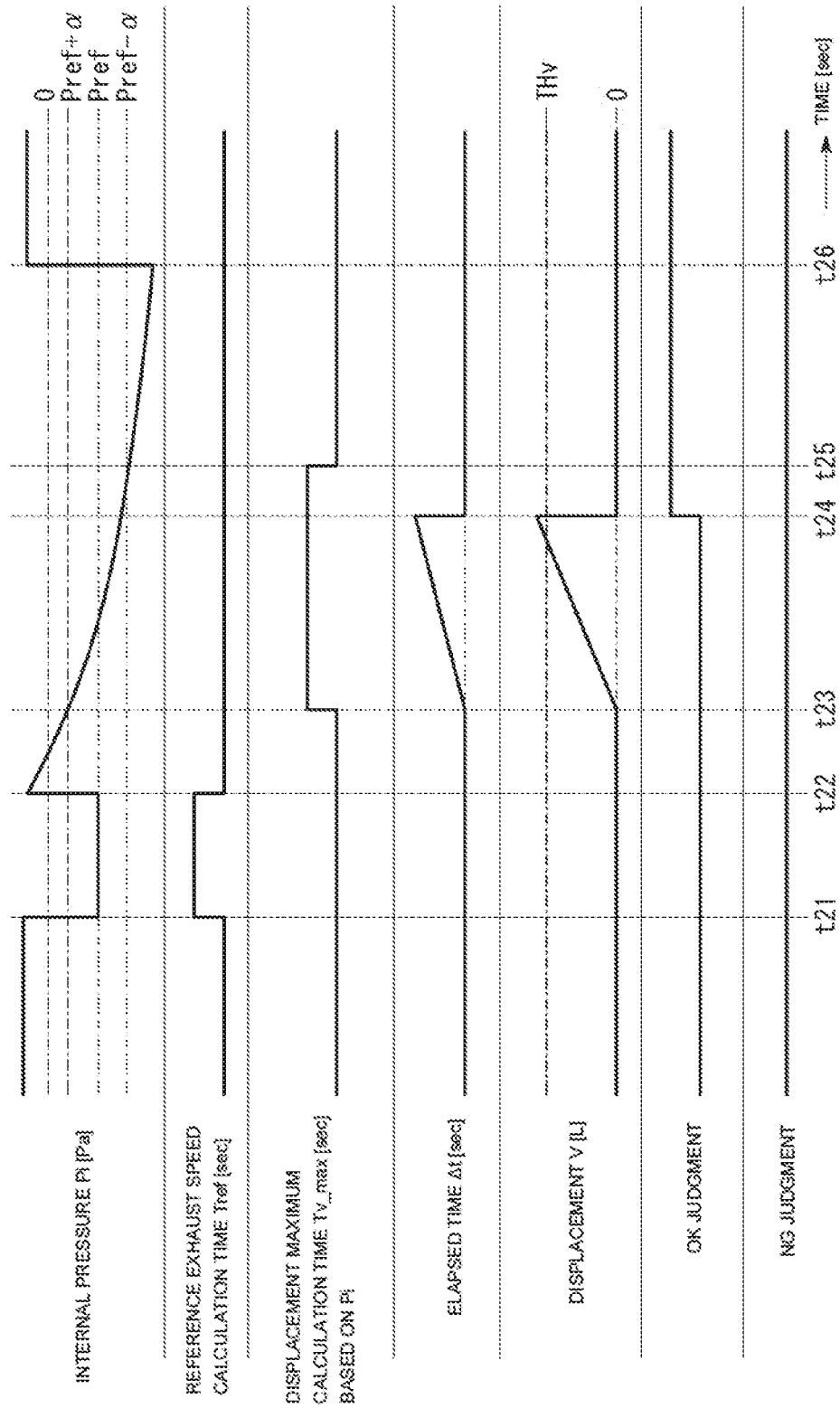
FIG. 11 is a diagram showing an example of values when the purge line blockage diagnosis control of the first embodiment is performed on the purge line in which no blockage has occurred (i.e., normal).

FIG. 11 is a diagram showing an example of values when the purge line blockage diagnosis control of the first embodiment is performed on the purge line 90 in which no blockage has occurred (i.e., normal). In FIG. 11 (and FIGS. 12, 14, and 15 to be described later), a reference exhaust speed-calculation time Tref is time [sec] required to calculate the reference exhaust speed Qref.

In addition, in FIG. 11 and other drawings, a displacement maximum calculation time Tv_max (hereinafter also referred to as "maximum time Tv_max.") is time [sec] required to reduce the internal pressure Pi from the sum Pref+α (first pressure value P1) of the reference pressure value Pref and the predetermined value α, to the difference Pref−α (second pressure value P2) between the reference pressure value Pref and the predetermined value α. The word "maximum" is added because in the first embodiment, the determination "no blockage" is confirmed when the displacement V becomes equal to or higher than the threshold THv, and therefore the calculation time of the displacement V is sometimes shorter than the maximum time Tv_max.

Note that both the reference exhaust speed-calculation time Tref and the displacement maximum, calculation time Tv_max are shown for the sake of a better understanding, and are not targets of control used in actual blockage diagnosis control (see FIGS. 8 to 10).

Reference exhaust speed calculation processing is performed at time point t21 to t22 in FIG. 11. This rapidly reduces the internal pressure Pi to the reference pressure value Pref. Note that as described above, in the first embodiment, there are only two kinds of operational control of the negative pressure pump 134, which are ON and OFF. The reason of the rapid reduction of the internal pressure Pi to the reference pressure value Pref as in FIG. 11 is because the LCM solenoid valve 130 closes the first bypass channel 142 (FIG. 4), whereby the space to be decompressed by the negative pressure pump 134 is limited to the first bypass channel 142, the second bypass channel 144, and the third bypass channel 146.

Additionally, the internal pressure Pi is substantially maintained at the reference pressure value Pref at time point t21 to t22, because the negative pressure pump 134 quickly reaches its limit of decompression due to a relatively small diameter d of the orifice 132. Hence, the internal pressure Pi is not purposely controlled to achieve a target value. Instead, the reference pressure value Pref is equivalent to the internal pressure Pi when the negative pressure of the negative pressure pump 134 is equilibrated by the orifice 132.

At time point t22, the reference exhaust speed calculation processing is terminated, and the negative pressure pump 134 is temporarily stopped (S27 of FIG. 9). When blockage detection processing is started immediately after this, the first closing portion 150 of the LCM solenoid valve 130 interrupts the main channel 140, and the second closing portion 152 connects the main channel 140 and the first bypass channel 142 (FIG. 5 and S31 of FIG. 10). Additionally, operation of the negative pressure pump 134 is resumed (S32 of FIG. 10). Note that operation of the negative pressure pump 134 may be continued while switching from the reference exhaust speed calculation processing to the blockage detection processing, if the operation does not largely affect the blockage detection accuracy.

At time point t23 in FIG. 11, when the internal pressure Pi becomes equal to or lower than the sum Pref+α of the reference pressure value Pref and the predetermined value α (S34: YES in FIG. 10), calculation of the displacement V is started. With this, the elapsed time Δt and the displacement V increase continuously from time point t23 and afterward (S36, S37 in FIG. 10). At time point t24, when the displacement V becomes equal to or higher than the flow rate threshold THv (S38: YES in FIG. 10), the ECU 116 determines that no blockage has occurred in the purge line 90 (S39). This judgment is indicated as "OK judgment" in FIG. 11.

(A-2-5-2. Example of Case Where Blockage is Present)

Figure 12:
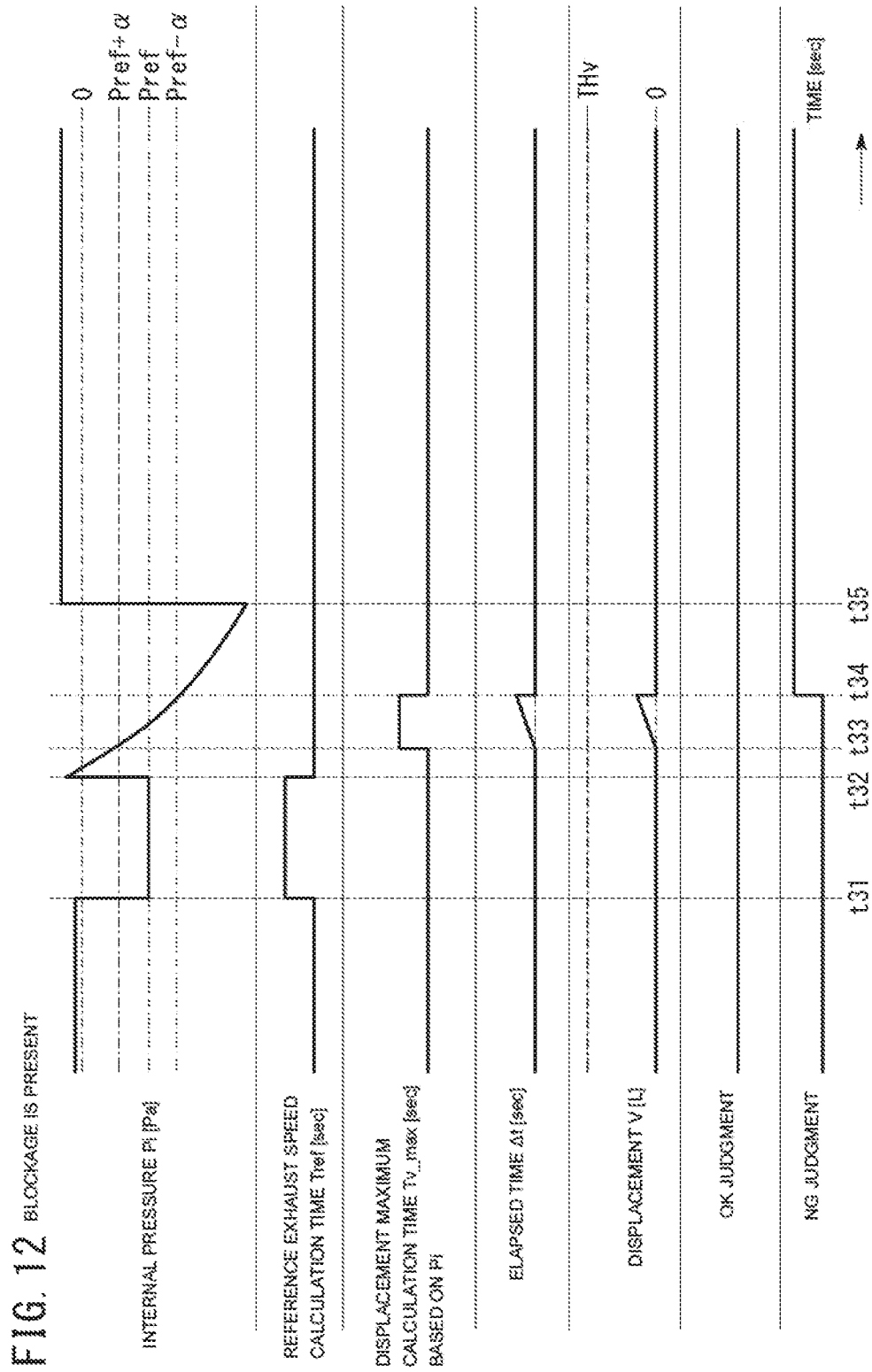
FIG. 12 is a diagram showing an example of values when the purge line blockage diagnosis control of the first embodiment is performed on the purge line in which a blockage has occurred.

FIG. 12 is a diagram showing an example of values when the purge line blockage diagnosis control of the first embodiment is performed on the purge line 90 in which a blockage has occurred. Reference exhaust speed calculation processing is performed at time point t31 to t32. The processing in this step is the same as in FIG. 11. That is, even if the purge line 90 is blocked, the reference exhaust speed calculation processing is performed in the same manner if the orifice 132 is not closed.

At time point t32, the reference exhaust speed calculation processing is terminated, and the negative pressure pump 134 is temporarily stopped (S27 of FIG. 9). When blockage detection processing is started immediately after this, the first closing portion 150 of the LCM solenoid valve 130 interrupts the main channel 140, and the second closing portion 152 connects the main channel 140 and the first bypass channel 142 (FIG. 5 and S31 of FIG. 10). Additionally, operation of the negative pressure pump 134 is resumed (S32 of FIG. 10).

As compared to the case of FIG. 11 in which no blockage has occurred, decompression from time point t32 and afterward is rapid in the case of FIG. 12 in which blockage has occurred. In other words, a decompression speed Qp [Pa/sec] of the negative pressure pump 134 from time point t32 to t35 in FIG. 12 is higher than the decompression speed Qp from time point t22 to t26 in FIG. 11. This is because the purge line 90 is blocked in the example of FIG. 12, so even if the exhaust, speed Q [L/sec] of the negative pressure pump 134 is the same or similar to the case of FIG. 11, a smaller volume is decompressed by the negative pressure pump 134.

At time point t33 in FIG. 12, when the internal pressure Pi becomes equal to or lower than the sum Pref+α of the reference pressure value Pref and the predetermined value α (S34: YES in FIG. 10), calculation, of the displacement V is started. With this, the elapsed time Δt and the displacement V increase continuously (S36, S37 of FIG. 10). Since the decompression speed Qp is high (in other words, the elapsed time Δt of decompression of the internal pressure Pi from the sum Pref+α to the difference Pref–α is short) in the example of FIG. 12, the displacement V does not reach the threshold THv even at time point t34 when the internal pressure Pi becomes lower than the difference Pref–α (S40: YES in FIG. 10). For this reason, the ECU 116 determines that a blockage has occurred in the purge line 30 (S41).

<A-3. Effects of First Embodiment>

As has been described, according to the first embodiment, if the flow rate V of the inner fluid Fi in the purge line 90 becomes equal to or higher than the flow rate threshold THv (S38: YES in FIG. 10) while the internal pressure Pi (pressure) of the purge line 90 decreases from the sum Pref+α (first pressure value P1) of the reference pressure value Pref and the predetermined value α to the difference Pref–α (second pressure value P2) between the reference pressure value Pref and the predetermined value α, it is determined that no blockage has occurred in the purge line 90 (S39, FIG. 11). Meanwhile, if the flow rate V when the internal pressure Pi is reduced from the sum Pref+α to the difference Pref–α becomes lower than the flow rate threshold THv (S40: YES), it is determined that a blockage has occurred in the purge line 90 (S41, FIG. 12). Hence, by setting an appropriate difference Pref–α (second pressure value P2), it is possible to avoid excessive decompression, and prevent deterioration in the purge line 90 and other parts due to excessive decompression.

In the first embodiment, the blockage determination portion 174 (FIG. 2) includes:

the exhaust speed calculator 180 that calculates the reference exhaust speed Qref as the exhaust speed Q of the inner fluid Fi during operation of the negative pressure pump 134 (negative pressure source);

the elapsed time calculator 182 that calculates the elapsed time Δt from a time point when the internal pressure Pi (pressure of purge line 90) is the sum Pref+α (first pressure value P1) of the reference pressure value Pref and the predetermined value α; and the flow rate calculator 184 that calculates the flow rate V of the inner fluid Fi on the basis of the reference exhaust speed Qref and the elapsed time Δt (FIG. 2). Hence, it is possible to calculate the flow rate V of the inner fluid Fi by a simple method.

In the first embodiment, the blockage detection system 30 includes:

the switching valve 130 formed in the purge line 90;

the orifice 132 for introducing the inner fluid Fi;

the negative pressure pump 134;

the internal pressure sensor 136 (pump negative pressure sensor) that detects a negative pressure generated by the negative pressure pump 134;

the first bypass channel 142 that connects the switching valve 130 and the negative pressure pump 134; and the second bypass channel 144 that connects the orifice 132 and the negative pressure pump 134 (FIGS. 3 to 5).

Also, the monitoring ECU 116 (computer) calculates the reference exhaust speed Qref (FIG. 9) based on the pressure difference ΔP between the atmospheric pressure P0 and the internal pressure Pi and the diameter d of the orifice 132, after reducing the internal pressure Pi to the reference pressure value Pref by operating the negative pressure pump 134 with the purge line 90 cut off from the inlet, of the negative pressure pump 134 by the switching valve 130. Furthermore, the ECU 116 calculates the elapsed time Δt (FIG. 10) while reducing the negative pressure by the negative pressure pump 134 with the purge line 90 connected to the inlet of the negative pressure pump 134 by the switching valve 130.

According to the first embodiment, the reference exhaust speed Qref is calculated while actually operating the negative pressure pump 134 (FIG. 9). Hence, it is possible to detect the flow rate V of the inner fluid Fi accurately, even when there is change (including deterioration) in the state of the negative pressure pump 134, individual difference, or change in the atmospheric pressure P0. Additionally, when using the negative pressure pump 134 or the like for a different purpose (e.g., leakage detection of purge line 90), it is possible to detect blockage in the purge line 90 by using existing equipment.

In the first embodiment, the monitoring ECU 116 (computer) calculates the reference exhaust speed Qref as a fixed value (FIG. 9). Additionally, the ECU 116 sets the sum Pref+α (first pressure value P1) of the reference pressure value Pref and the predetermined value α, as a larger value than the reference pressure value Pref (S34 of FIG. 10, FIG. 11). The ECU 116 also sets the difference Pref−α (second pressure value P2) between the reference pressure value Pref and the predetermined value α, as a smaller value than the reference pressure value Pref (S40 of FIG. 10, FIG. 11).

Accordingly, when calculating the elapsed time Δt, the internal pressure Pi (pressure of purge line 90) temporarily passes the reference pressure value Pref. Hence, the environment of calculating the reference exhaust speed Qref and the environment of calculating the elapsed time Δt can be brought close to each other. This can enhance detection accuracy of the elapsed time Δt and the flow rate V of the inner fluid Fi, even when the exhaust speed Q of the negative pressure pump 134 varies according to variation of the internal pressure Pi.

B. Second Embodiment

<B-1. Configuration (Points Different from First Embodiment)>

The second embodiment uses the same hardware as the first embodiment. The difference between the first embodiment and the second embodiment is that the monitoring ECU 116 performs different blockage detection processing.

<B-2. Purge Line Blockage Diagnosis Control>

[B-2-1. Overview of Purge Line Blockage Diagnosis Control]

Although blockage diagnosis control of the second embodiment includes the blockage detection processing different from the blockage diagnosis control of the first embodiment, other points (detection principle, overall flow of blockage diagnosis control (FIG. 8), and reference exhaust speed calculation processing (FIG. 9)) of the second embodiment are the same as in the first embodiment.

[B-2-2. Blockage Detection Processing]

(B-2-2-1. Points Different from First Embodiment)

In the blockage detection processing of the first embodiment, the determination "no blockage" is confirmed (S39 of FIG. 10, FIG. 11) at the point when the displacement V becomes equal to or higher than the threshold THv (S38: YES in FIG. 10). On the other hand, in the blockage detection processing of the second embodiment, calculation of an elapsed time Δt is continued until an internal pressure Pi is reduced from a sum Pref+α (first, pressure value P1) of a reference pressure value Pref and a predetermined value α, to a difference Pref−α (second pressure value P2) between the reference pressure value Pref and the predetermined value α. Then, a displacement V is calculated by using a reference exhaust speed Qref and the elapsed time Δt.

(B-2-2-2. Concrete Processing)

Figure 13:
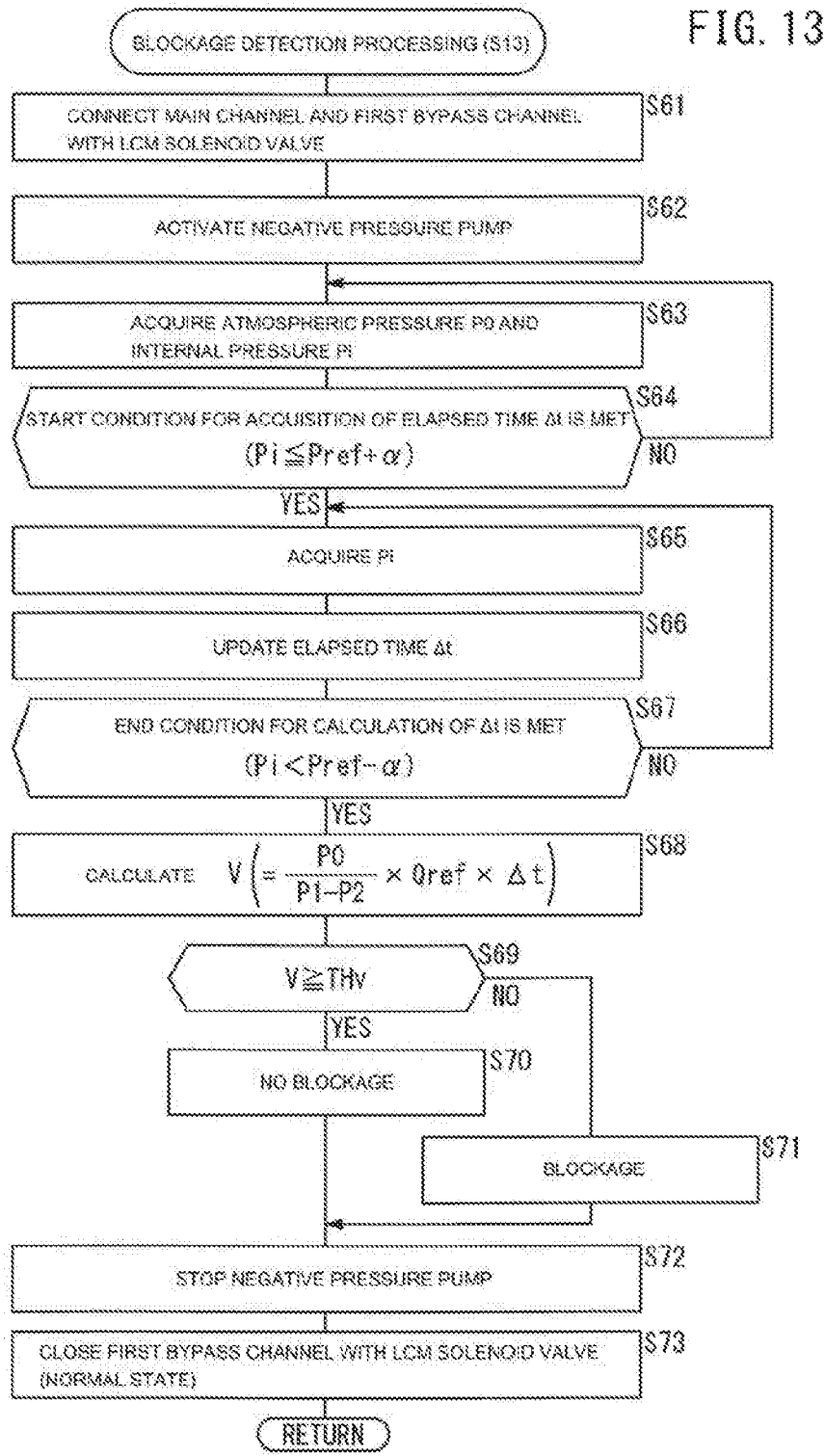
FIG. 13 is a flowchart of blockage detection processing (details of S13 of FIG. 8) of a second embodiment.

FIG. 13 is a flowchart of the blockage detection processing (details of S13 of FIG. 8) of the second embodiment, Steps S61 to S63 are the same as steps S31 to S33 of FIG. 10.

In step S64, the ECU 116 determines whether a start condition for acquisition of the elapsed time Δt is met. Specifically, the ECU 116 determines whether the internal pressure Pi is equal to or lower than the sum Pref+α (first pressure value P1) of the reference pressure value Pref (S23 of FIG. 9) and the predetermined value α. If the start condition is not met (S64: NO), the processing returns to step S63. If the start condition is met (S64: YES), the processing proceeds to step S65.

Steps S65, S66 are the same as steps S35, S36 of FIG. 10.

In step S67, the ECU 116 determines whether an end condition for calculation of the elapsed time Δt is met. Specifically, the ECU 116 determines whether the internal pressure Pi is lower than the difference Pref−α (second pressure value P2) between the reference pressure value Pref and the predetermined value α. If the end condition is not met (S67: NO), the processing returns to step S65, and calculation of the elapsed time Δt is continued. If the end condition is met (S66: YES), the elapsed time Δt is confirmed and the processing proceeds to step S68.

Step S68 is the same as step S37 of FIG. 10. Specifically, the ECU 116 calculates the displacement V (see aforementioned equation (3)) based on the reference exhaust speed Qref, the elapsed time Δt, an atmospheric pressure P0, the first pressure value P1 (=Pref+α), and the second pressure value P2 (=Pref−α). Steps S69 to S73 are the same as steps S38, S39 and S41 to S43 of FIG. 10.

[B-2-3. Comparison of Case Where Blockage is Present and Case Where Blockage is Absent]

(B-2-3-1. Example of Case Where Blockage is Absent)

Figure 14:
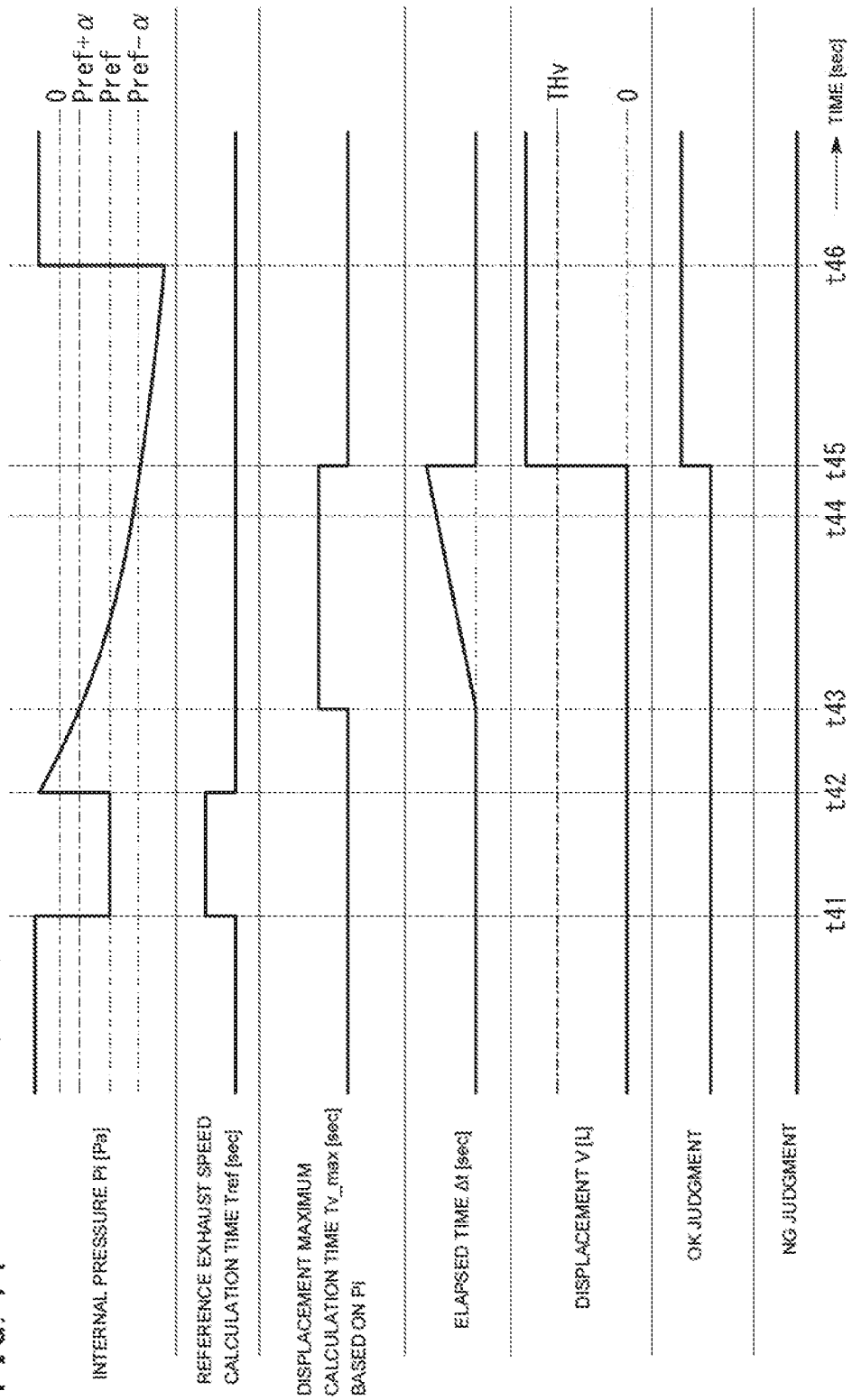
FIG. 14 is a diagram showing an example of values when purge line blockage diagnosis control of the second embodiment is performed on a purge line in which no blockage has occurred (i.e., normal).

FIG. 14 is a diagram showing an example of values when purge line blockage diagnosis control of the second embodiment is performed on a purge line 90 in which no blockage has occurred (i.e., normal). Operation from time point t41 to immediately before time point t44 in FIG. 14 is the same as the operation from time point t21 to immediately before time point t24 in FIG. 11.

In FIG. 11, the determination "no blockage" is confirmed (S38: YES→S39 in FIG. 10) at time point t24 when the displacement V becomes equal to or higher than the threshold THv. Meanwhile, in FIG. 14, at time point t44 corresponding to time point t24 of FIG. 11, calculation of the elapsed time Δt is continued without confirming the determination "no blockage" (see S65 to S67 of FIG. 13).

At time point t45 in FIG. 14, when the internal pressure Pi becomes lower than the difference Pref−α (second pressure value P2) between the reference pressure value Pref and the predetermined value α (S67: YES in FIG. 13), the ECU 116 calculates the displacement V by using the reference exhaust speed Qref, the elapsed time Δt, and the like (S68). Then, if blockage is absent, the displacement V becomes equal to or higher than the threshold THv (S69: YES), and therefore the ECU 116 determines that no blockage has occurred (S70).

Note that the rapid increase of the displacement V at time point t45 in FIG. 14 indicates that the displacement V is calculated for the first time at time point t45. Accordingly, the OK determination is confirmed at time point t45 as well.

(B-2-3-2. Example of Case Where Blockage is Present)

Figure 15:
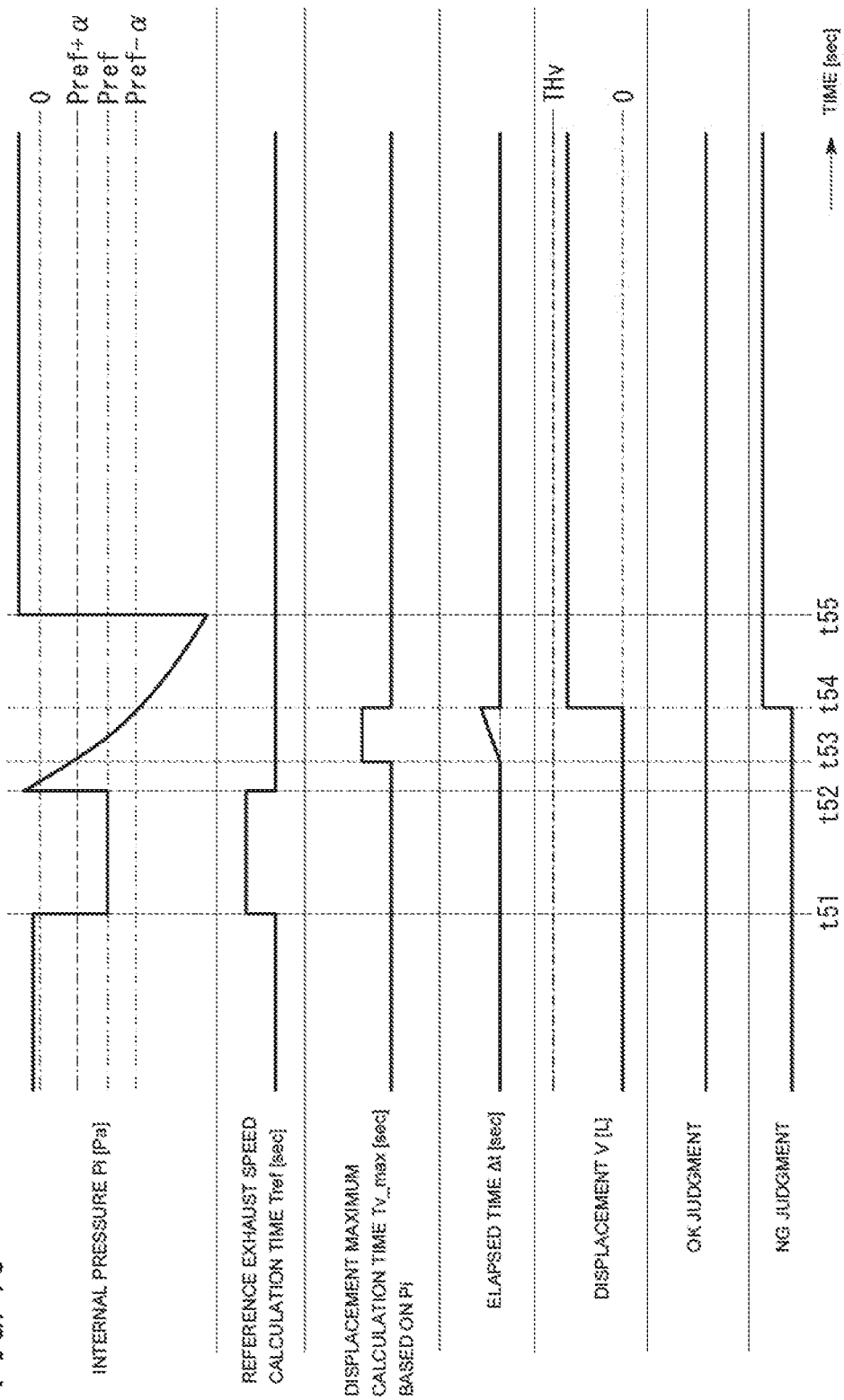
FIG. 15 is a diagram showing an example of values when the purge line blockage diagnosis control of the second embodiment is performed on the purge line in which a blockage has occurred.

FIG. 15 is a diagram showing an example of values when the purge line blockage diagnosis control of the second embodiment is performed on the purge line 90 in which a blockage has occurred. Since a blockage has occurred in the case of FIG. 15, the displacement maximum calculation time Tv_max (time point t53 to t54) is basically the same as the example of FIG. 12 (time point t33 to t34). Note, however, that in the example of FIG. 12, the displacement V increases continuously (S35 to S38 of FIG. 10) at time point t33 to t34. Meanwhile, in the example of FIG. 15, the displacement V is calculated only after time point t54, whereby the NG determination is confirmed (see S65 to S68 of FIG. 13).

<B-3. Effects of Second Embodiment>

According to the second embodiment described above, the following effects can be achieved in addition to or instead of the effects of the first embodiment.

Specifically, in the second embodiment, the displacement V is calculated (S68) after the internal pressure Pi (pressure of purge line 90) becomes lower than the difference Pref−α (second pressure value P2) between the reference pressure value Pref and the predetermined value α (S67: YES in FIG. 13). Hence, it is possible to reduce the load of calculation of the displacement V. Note that in the first embodiment, the determination "no blockage" is confirmed when the displacement V becomes equal to or higher than the flow rate threshold THv, even before the internal pressure Pi (pressure of purge line 90) becomes lower than the difference Pref−α (second pressure value P2). For this reason, the determination "no blockage" can be confirmed earlier in the first embodiment.

C. Third Embodiment

<(C-1. Configuration (Points Different from First Embodiment)>

Figure 16:
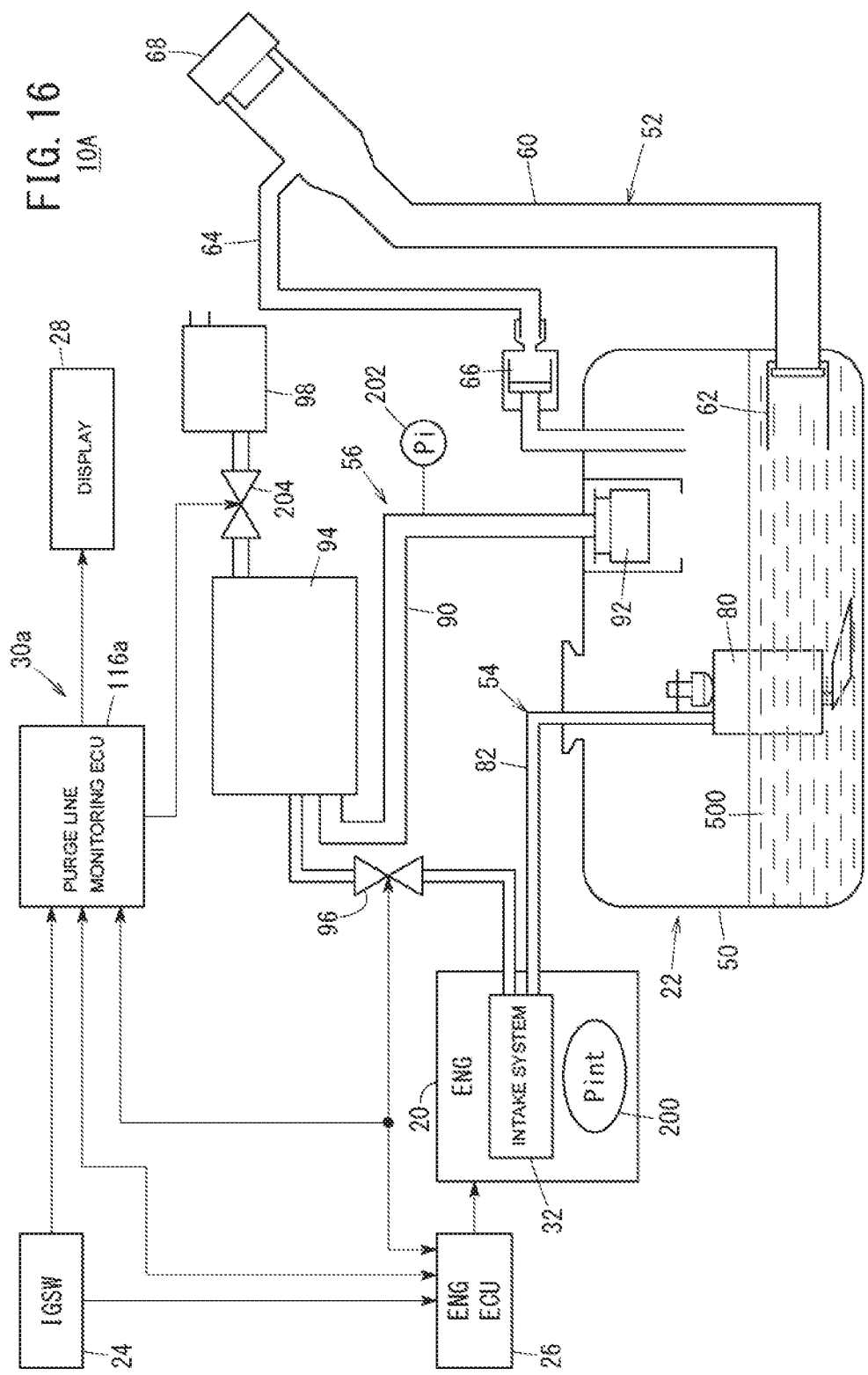
FIG. 16 is a diagram showing a simplified configuration of a vehicle that includes a purge line monitoring system as a blockage detection system of a third embodiment of the present invention.

FIG. 16 is a diagram showing a simplified configuration of a vehicle 10A that includes a purge line monitoring system 30a (hereinafter also referred to as "monitoring system 30a.") as a blockage detection system of a third embodiment of the present invention. The vehicle 10A of the third embodiment does not have the LCM 110 as a negative pressure source of the first and second embodiments. Instead, the third embodiment uses an engine 20 as a negative pressure source. Additionally, the vehicle 10A has an intake manifold negative pressure sensor 200 (hereinafter also referred to as "manifold sensor 200."), an internal pressure sensor 202, and an isolation valve 204. Components of the third embodiment common to the first and second embodiments are assigned the same reference numerals, and detailed descriptions thereof are omitted.

The manifold sensor 200 detects a negative pressure Pint (hereinafter also referred to as "manifold negative pressure Pint.") [Pa] in an intake manifold (not shown) included in an intake system 32 of the vehicle 10A. The internal pressure sensor 202 detects a pressure (internal pressure Pi) [Pa] of a purge line 90 (particularly between tank 50 and canister 94). The isolation valve 204 is arranged between the canister 94 and a dust filter 98, and controls connection between the purge line 90 (canister 94 and other parts) and the outside, according to an instruction from an ECU 116a.

<C-2. Purge Line Blockage Diagnosis Control>

[C-2-1. Overview of Purge Line Blockage Diagnosis Control]

The principle of detecting blockage in the purge line 90 in the third embodiment is basically the same as the first and second embodiments. That is, the third embodiment also uses a displacement V of an inner fluid Fi to detect blockage in the purge line 90.

Note, however, that the third embodiment uses the engine 20 instead of the LCM 110 as the negative pressure source. Additionally, since the vehicle 10A of the third embodiment does not have an orifice 132, reference exhaust speed calculation processing using the orifice 132 is not performed in blockage diagnosis control of the third embodiment. However, the reference exhaust speed calculation processing using the orifice 132 may be performed in the third embodiment as well.

[C-2-2. Concrete Flow of Purge Line Blockage Diagnosis Control]

Figure 17:
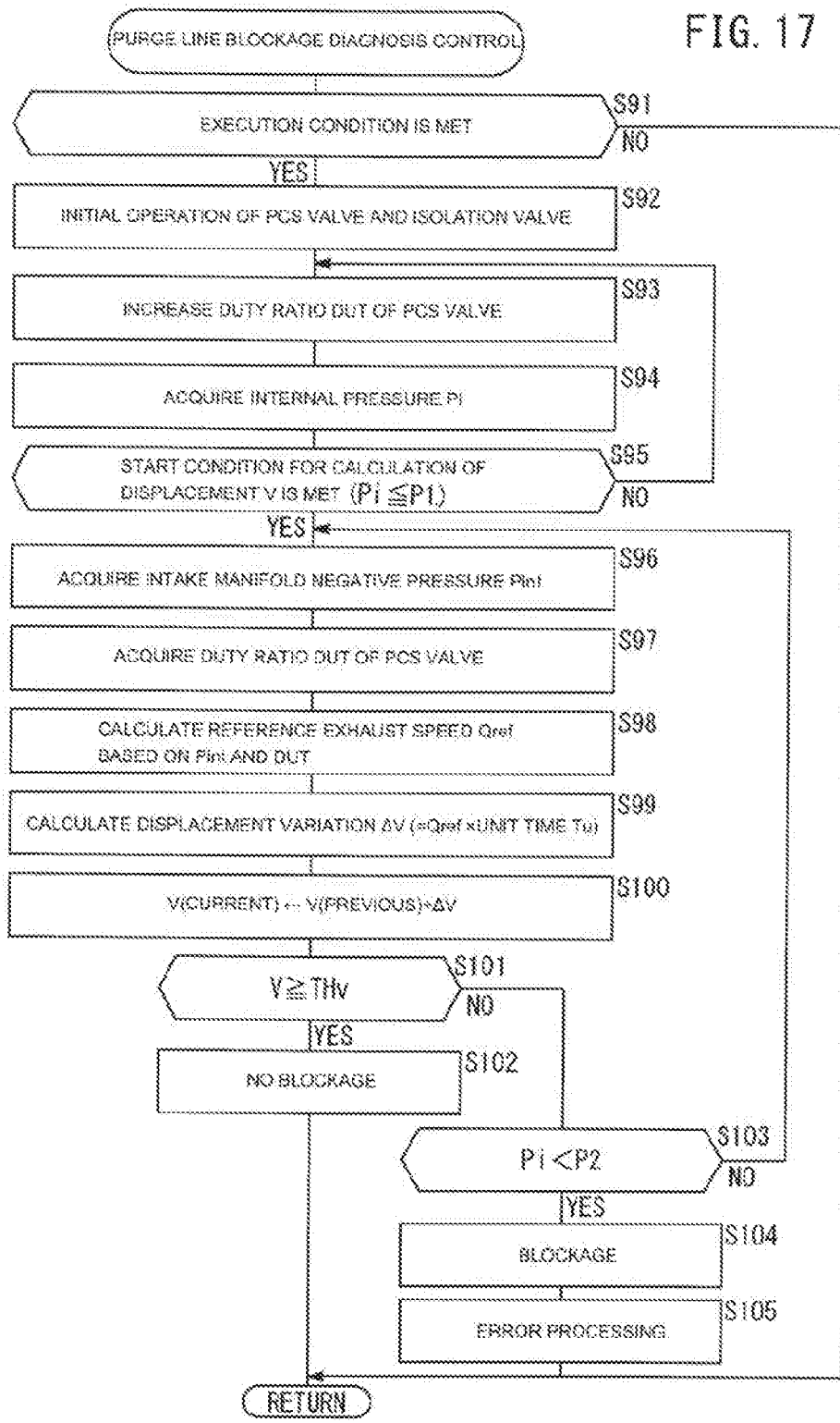
FIG. 17 is a flowchart of purge line blockage diagnosis control of the third embodiment.

FIG. 17 is a flowchart of purge line blockage diagnosis control of the third embodiment. In step S91, the monitoring ECU 116a determines whether an execution condition for determining presence or absence of a blockage in the purge line 90 is met. An example of the execution condition is completion of warm-up of the engine 20, and/or a stable operation of the engine 20.

Completion of warm-up of the engine 20 is determined according to whether the temperature of cooling water of the engine 20 detected by an unillustrated temperature sensor is equal to or higher than a temperature threshold, for example. A stable operation of the engine 20 is determined according to whether variation (e.g., peak-to-peak value within predetermined period) of the intake manifold negative pressure Pint is equal to or lower than a predetermined pressure threshold for example.

If the execution condition is met (S91: YES), the processing proceeds to step S92, and if the execution condition is not met (S91: NO), the current processing is terminated, and step S91 is executed again after the elapse of a certain time period.

In step S92, the monitoring ECU 116a performs initial operation using a PCS valve 96 and the isolation valve 204. Specifically, the ECU 116a sets a duty ratio DUT of the PCS valve 96 to zero when fuel is purged through the purge line 90. The duty ratio DUT is a rate [%] at which a drive signal (ON signal) is output to the PCS valve 96 in a control period. Accordingly, by setting the duty ratio DUT to zero, the inner fluid Fi is kept from passing through the PCS valve 96. Then, the ECU 116a closes the isolation valve 204. Thus, an enclosed space is formed in the purge line 90. The internal pressure Pi at this time becomes substantially equal to an atmospheric pressure P0.

In step S93, the ECU 116a increases the duty ratio DUT of the PCS valve 96 by a predetermined amount. This causes the negative pressure (intake manifold negative pressure Pint) of the engine 20 to act on the purge line 90, so that the internal pressure Pi is reduced. In step S94, the ECU 116a acquires the internal pressure Pi from the internal pressure sensor 202.

In step S95, the ECU 116a determines whether a start condition for calculation of the displacement V is met. Specifically, the ECU 116a determines whether the internal pressure Pi is equal to or lower than a first pressure value P1. The first pressure value P1 is a value corresponding to the sum Pref+α of the reference pressure value Pref and the predetermined value α of the first and second embodiments. The first pressure value P1 of the third embodiment is set as a theoretical value, a design value, or a simulation value. If the start condition for calculation of the displacement V is met (S95: YES), the processing proceeds to step S96, and if the start condition for calculation of the displacement V is not met (S95: NO), the processing returns to step S93.

In step S36, the ECU 116a acquires the intake manifold negative pressure Pint from the manifold sensor 200. In step S97, the ECU 116a acquires the duty ratio DUT of the PCS valve 96 (FIG. 16). Note that the ECU 116a continues to increase the duty ratio DUT even while repeating steps S96 to S100.

In step S98, the ECU 116a calculates a reference exhaust speed Qref based on the manifold negative pressure Pint and the duty ratio DUT.

Figure 18:
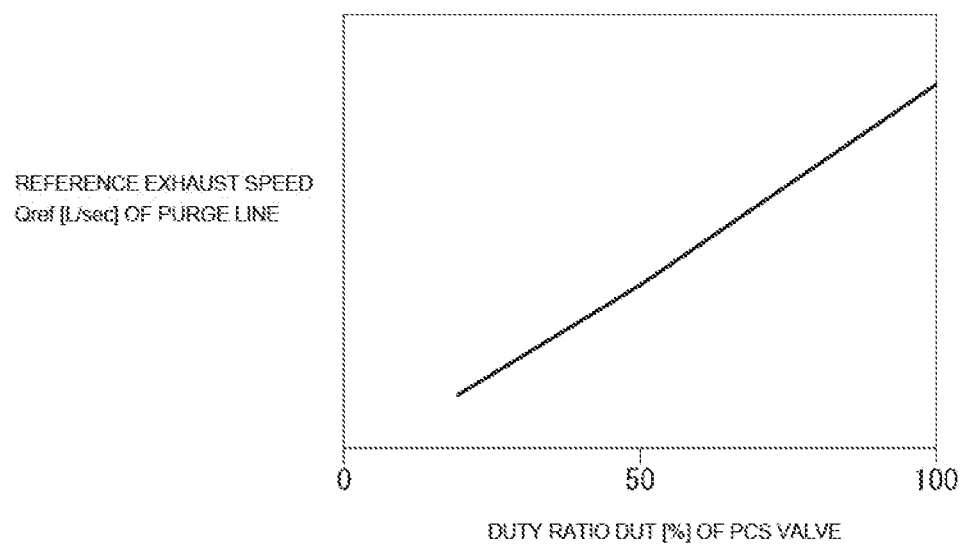
FIG. 18 is a diagram showing a relation between a duty ratio of a regulating valve (PCS valve) and a reference exhaust speed of a purge line of the third embodiment.

FIG. 18 is a diagram showing a relation between the duty ratio DUT of the PCS valve 96 and the reference exhaust speed Qref of the purge line 90 of the third embodiment. Note that the relation shown in FIG. 18 is a case where the manifold negative pressure Pint is a specific value, and that the relation varies depending on the manifold negative pressure Pint. As can be seen from FIG. 18, if the manifold negative pressure Pint is constant, the reference exhaust speed Qref increases according to an increase of the duty ratio DUT.

Figure 19:
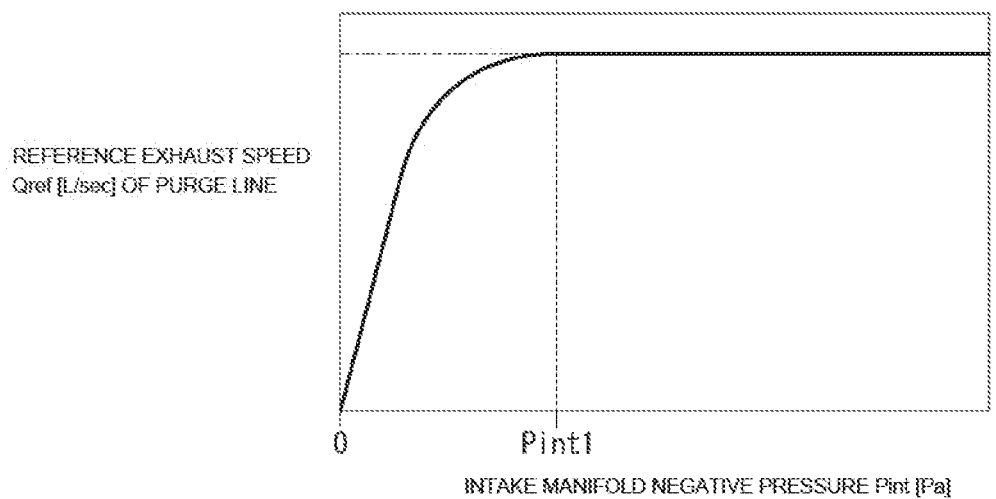
FIG. 19 is a diagram showing a relation between an intake manifold negative pressure and the reference exhaust speed of the purge line of the third embodiment.

FIG. 19 is a diagram showing a relation between the intake manifold negative pressure Pint and the reference exhaust speed Qref of the purge line 90 of the third embodiment. Note that the relation shown in FIG. 19 is a case where the duty ratio DUT of the PCS valve 96 is a specific value, and that the relation varies depending on the duty ratio DUT. As can be seen from FIG. 19, if the duty ratio DUT is constant, the reference exhaust speed Qref increases according to an increase of the manifold negative pressure Pint from zero to Pint1. If the manifold negative pressure Pint is equal to or higher than Pint1, the reference exhaust speed Qref is substantially constant.

As has been described, the reference exhaust speed Qref is correlated with the duty ratio DUT of the PCS valve 96 and the manifold negative pressure Pint. Hence, the ECU 116a sets the reference exhaust speed Qref based on the duty ratio DUT of the PCS valve 96 and the manifold negative pressure Pint. Note that a person in charge stores the relation between the reference exhaust speed Qref and the duty ratio DUT and manifold negative pressure Pint beforehand in the storage portion 164 of the ECU 116a.

Referring back to FIG. 17, in step S99, the ECU 116a calculates a displacement variation ΔV as a product of the reference exhaust speed Qref and a unit time Tu. The unit time Tu is synonymous with an operation period of the reference exhaust speed Qref.

In step S100 the ECU 116a sets the total of the previous displacement V and the current displacement variation ΔV as the current displacement V.

In step S101, the ECU 116a determines whether the displacement V is equal to or higher than a threshold THv. If the displacement V is equal to or higher than the threshold THv (S101: YES), in step S102, the ECU 116a determines that no blockage has occurred in the purge line 90. If the displacement V is not equal to or higher than the threshold THv (S101: NO), the processing proceeds to step S103.

In step S103, the ECU 116a determines whether the internal pressure Pi is lower than a second pressure value P2. The second pressure value P2 is a value corresponding to the difference Pref−α between the reference pressure value Pref and the predetermined value α of the first and second embodiments. The second pressure value P2 of the third embodiment is set as a theoretical value, a design value, or a simulation, value. If the internal pressure Pi is lower than the second pressure value P2 (S103: YES), the processing proceeds to step S104, and if the internal pressure Pi is not lower than the second pressure value P2 (S103: NO), the processing returns to step S96.

In step S104, the ECU 116a determines that a blockage has occurred in the purge line 90. The next step S103 is the same as step S15 of FIG. 8.

<C-3. Effects of Third Embodiment>

According to the third embodiment described above, the following effects can be achieved in addition to or instead of the effects of the first and second embodiments.

In the third embodiment, the negative pressure source is the engine 20 (internal combustion engine) (FIG. 16). The blockage detection system 30a includes the manifold sensor 200 (engine negative pressure sensor) that detects a negative pressure generated by the engine 20 (FIG. 16). The negative pressure controller 170 controls the internal pressure Pi (negative pressure generated by engine 20 and supplied to purge line 90) through the PCS valve 96 (regulating valve) arranged between the purge line 90 and the engine 20 (FIG. 17).

Thus, it is possible to detect blockage in the purge line 90 even when using the engine 20 as the negative pressure source. Additionally, use of the PCS valve 96 for negative pressure (internal pressure Pi) control enables detailed control of the negative pressure for blockage detection, so that blockage detection accuracy can be enhanced.

D. Modification

Note that the present invention is not limited to the aforementioned embodiments, and various configurations can be made on the basis of contents of the specification, as a matter of course. For example, the following configurations may be adopted.

<D-1. Application>

The aforementioned embodiments each describes a configuration in which the blockage detection system 30, 30a is applied to the vehicle 10, 10A (FIG. 1, FIG. 16). The vehicle 10 in the embodiment is assumed to be an automobile. However, from the standpoint of detection of blockage in the purge line 90, for example, application of the invention is not limited to this. For example, the invention may be applied to vehicles (carriages) such as a ship and an aircraft. Alternatively, the invention is also applicable to a production unit, for example.

<D-2. Detection of Blockage in Purge Line 90>

In the first embodiment, the monitoring ECU 116 installed in the vehicle 10 performs purge line blockage diagnosis control (FIG. 1). However, the blockage diagnosis control does not necessarily have to be performed in the vehicle 10, and may be performed by an external server if the vehicle 10 and the external server are connected. The same applies to the second, and third embodiments.

In the first embodiment, it is determined whether a blockage is present in the purge line 90 by directly comparing the displacement V [L] with the threshold THv (S38, S39, S41 of FIG. 10). However, from the standpoint of detecting blockage in the purge line 90 based on variation in the displacement V while reducing the internal pressure Pi (pressure of purge line 90) from the first pressure value P1 to the second pressure value P2, for example, the invention is not limited to this. For example, blockage may be detected by comparing an elapsed time Δt from the first pressure value P1 to the second pressure value P2, and an elapsed time threshold THΔt. Note that the comparison between the elapsed time Δt and the elapsed time threshold THΔt is equivalent to the comparison between the displacement V and the threshold THv. The same applies to the second and third embodiments.

In the first embodiment, the displacement V is calculated from the sum Pref+α (first pressure value P1) of the reference pressure value Pref and the predetermined value α, to the difference Pref−α (second pressure value P2) between the reference pressure value Pref and the predetermined value α. In other words, the internal pressure Pi passes the reference pressure value Pref (see FIGS. 6, 11, for example). However, from the standpoint of calculating the displacement V by using the reference exhaust speed Qref and the elapsed time Δt (if less accuracy is allowable to some extent), for example, the internal pressure Pi may be varied within a range where it does not pass the reference pressure value Pref. The same applies to the aforementioned second and third embodiments.

In the first embodiment, the detected value of a single internal pressure sensor 136 is used as the pressure value used for calculation of the flow rate V. However, from the standpoint of calculating or detecting the flow rate V, for example, it is also possible to provide multiple pressure sensors, and calculate the flow rate V according to Bernoulli's principle by use of a pressure difference among the multiple pressure sensors. In this case, a first pressure sensor is arranged on the tank 50 side of the orifice 132 (FIG. 3), and a second sensor is arranged on the negative pressure pump 134 side of the office 132.

In the first embodiment, fluid passing through the orifice 132 is the inner fluid Fi (see FIGS. 3 to 5). However, if the purge line 90 can be kept separate from the outside, fresh air may be allowed to pass through the orifice 132. The purge line 90 can be separated from the outside by combining the switching valve 130 and other valves, for example. The same applies to the aforementioned second and third embodiments.

<D-3. Other Configurations>

In the aforementioned embodiments, some numerical comparisons include an equal sign, depending on the case (e.g., S34, S38, S40 of FIG. 10). However, if there is no specific reason to add or remove the equal sign (i.e., if the effects of the present invention can be achieved), an equal sign may either be included or not included in a numerical comparison.

Hence, the determination on whether the internal pressure Pi is equal to or lower than the sum Pref+α of the reference pressure value Pref and the predetermined value α in step S34 of FIG. 10 can be replaced with a determination on whether the internal pressure Pi is lower than the sum Pref+α.

| [Description of Reference Numerals] | |
|---|---|
| 20 | engine (internal combustion engine, negative pressure source) |
| 30, 30a | purge line monitoring system (blockage detection system) |
| 32 | intake system |
| 50 | fuel tank |
| 90 | purge line |
| 96 | PCS valve (regulating valve) |
| 116, 116a | purge line monitoring ECU (computer) |
| 130 | LCM switching valve (switching valve) |
| 132 | orifice |
| 134 | negative pressure pump (negative pressure source) |
| 136 | internal pressure sensor (pump negative pressure sensor) |
| 142 | first bypass channel |
| 144 | second bypass channel |
| 170 | negative pressure controller determination portion |
| 174 | blockage |
| 180 | exhaust speed calculator |
| 182 | elapsed time calculator |
| 184 | flow rate calculator |
| 200 | intake manifold negative pressure sensor (internal combustion engine negative pressure sensor) |
| 500 | volatile fuel |
| d | orifice diameter |
| Fi | inner fluid |
| Pi | internal pressure (pressure of purge line) |
| Pref | reference pressure value |
| P0 | atmospheric pressure |
| P1 | first pressure value |
| P2 | second pressure value |
| Qref | reference exhaust speed (exhaust speed) |
| THv | flow rate threshold |
| V | displacement (flow rate) |
| Δt | elapsed time |

The invention claimed is:

1. A blockage detection system for an internal combustion engine, the blockage detection system comprising:
a purge line configured to purge volatile fuel in a fuel tank to an intake system of the internal combustion engine;
a computer configured to determine occurrence of blockage in said purge line, wherein said computer comprises
a negative pressure controller configured to control a pressure in said purge line by operating a negative pressure source and controlling a negative pressure applied to said purge line from the negative pressure source, and
a blockage determiner configured to determine whether a blockage is present in said purge line,
said blockage determiner configured to
determine that no blockage has occurred in said purge line, when a displacement of an inner fluid in said purge line exceeds a displacement threshold during or after reduction of the pressure in said purge line from a first pressure value to a second pressure value by said negative pressure controller, and
determine that the blockage has occurred in said purge line, when the displacement of said inner fluid falls below said displacement threshold after the reduction of the pressure in said purge line from said first pressure value to said second pressure value by said negative pressure controller, and
said blockage determiner has
an exhaust rate calculator configured to calculate a reference exhaust flow rate of said inner fluid during the operation of said negative pressure source,
an elapsed time calculator configured to calculate an elapsed time from a time point when the pressure in said purge line is said first pressure value, and
a displacement calculator configured to calculate said displacement of said inner fluid based on said reference exhaust flow rate and said elapsed time.

2. The blockage detection system according to claim 1 further comprising:
an orifice that introduces any one of said inner fluid and fresh air;
a negative pressure pump which is said negative pressure source;
a switching valve formed in said purge line and configured to connect said purge line to an inlet of said negative pressure pump or disconnect said purge line from the inlet of said negative pressure pump;
a pump negative pressure sensor configured to detect the negative pressure generated by said negative pressure pump;
a first bypass channel that connects said switching valve and said negative pressure pump; and
a second bypass channel that connects said orifice and said negative pressure pump, wherein
said computer calculates said reference exhaust flow rate based on a difference between atmospheric pressure and said negative pressure and a diameter of said orifice, in a state where said negative pressure is reduced to a predetermined reference pressure value by operating said negative pressure pump with said purge line being disconnected from an inlet of said negative pressure pump by said switching valve, and calculates said elapsed time while reducing said negative pressure by said negative pressure pump in a state where said purge line is connected to the inlet of said negative pressure pump by said switching valve.

3. The blockage detection system according to claim 2, wherein
said computer calculates said reference exhaust flow rate as a fixed value,
sets said first pressure value as a value larger than said reference pressure value, and
sets said second pressure value as a value smaller than said reference pressure value.

4. The blockage detection system according to claim 1, wherein,
said negative pressure source is said internal combustion engine,
said blockage detection system comprises an internal combustion engine negative pressure sensor configured to detect a negative pressure generated by said internal combustion engine, and
said negative pressure controller controls the negative pressure generated by said internal combustion engine and supplied to said purge line, through a regulating valve arranged between said purge line and said internal combustion engine.

5. A blockage detection method for detecting blockage in a purge line that purges volatile fuel in a fuel tank to an intake system of an internal combustion engine by use of a computer, the method comprising:
a negative pressure control of, by said computer, operating a negative pressure source and controlling a negative pressure applied to said purge line from the negative pressure source, thereby controlling a pressure in said purge line; and
a blockage determination step of, by said computer, determining whether a blockage is present in said purge line, wherein
said blockage determination step comprises
determining that no blockage has occurred in said purge line, when a displacement of an inner fluid in said purge line exceeds a displacement threshold during or after reduction of the pressure in said purge line from a first pressure value to a second pressure value by said negative pressure source, and
determining that the blockage has occurred in said purge line, when the displacement of said inner fluid falls below said displacement threshold after reduction of the pressure in said purge line from said first pressure value to said second pressure value by said negative pressure source, and
the displacement of said inner fluid is calculated by steps of
calculating a reference exhaust flow rate of said inner fluid during an operation of said negative pressure source,
calculating an elapsed time from a time point when the pressure in said purge line is said first pressure value, and
calculating said displacement of said inner fluid based on said reference exhaust flow rate and said elapsed time.

* * * * *